INVENTORS
MARCELLO VANZO,
ANTONIO PACCIARINI AND
DARIO GILETTA
BY Stevens, Davis, Miller & Mosher
ATTORNEYS INVENTORS
MARCELLO VANZO,
ANTONIO PACCIARINI AND
DARIO GILETTA
BY Stevens, Davis, Miller & Mosher
ATTORNEYS July 25, 1961     M. VANZO ET AL     2,994,024
APPARATUS FOR THE AUTOMATIC CONTROL OF MACHINE MOVEMENTS
Filed March 13, 1957     17 Sheets-Sheet 8

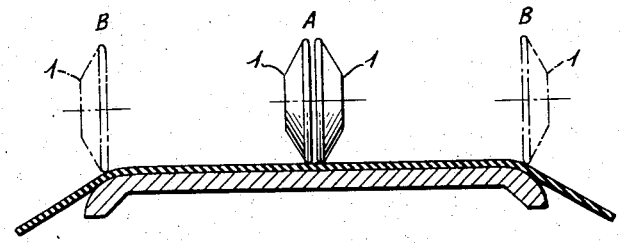
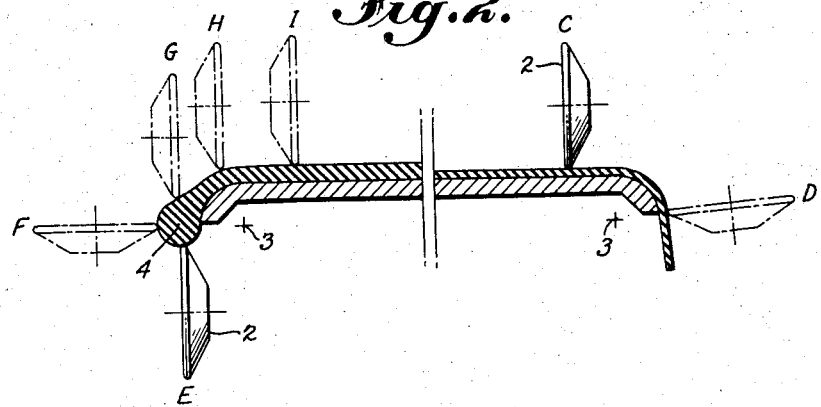
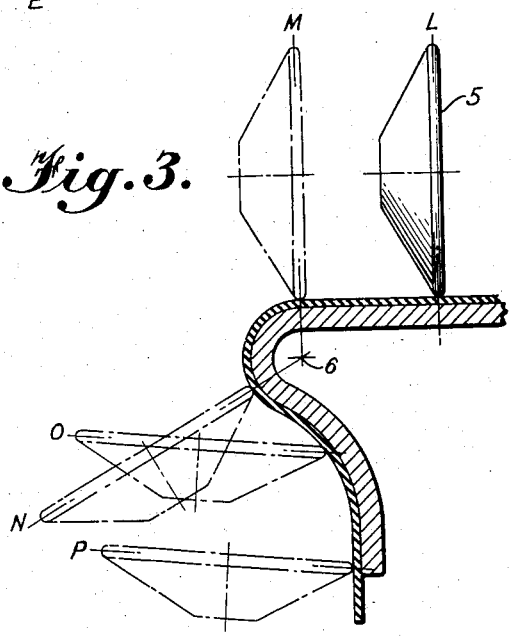

INVENTORS
MARCELLO VANZO,
ANTONIO PACCIARINI AND
DARIO GILETTA
BY
ATTORNEYS

July 25, 1961    M. VANZO ET AL    2,994,024
APPARATUS FOR THE AUTOMATIC CONTROL OF MACHINE MOVEMENTS
Filed March 13, 1957    17 Sheets-Sheet 11

INVENTORS
MARCELLO VANZO,
ANTONIO PACCIARINI AND
DARIO GILETTA
BY Stevens, Davis, Miller & Mosher
ATTORNEYS INVENTORS
MARCELLO VANZO,
ANTONIO PACCIARINI AND
DARIO GILETTA
BY Stevens, Davis, Miller & Mosher
ATTORNEYS

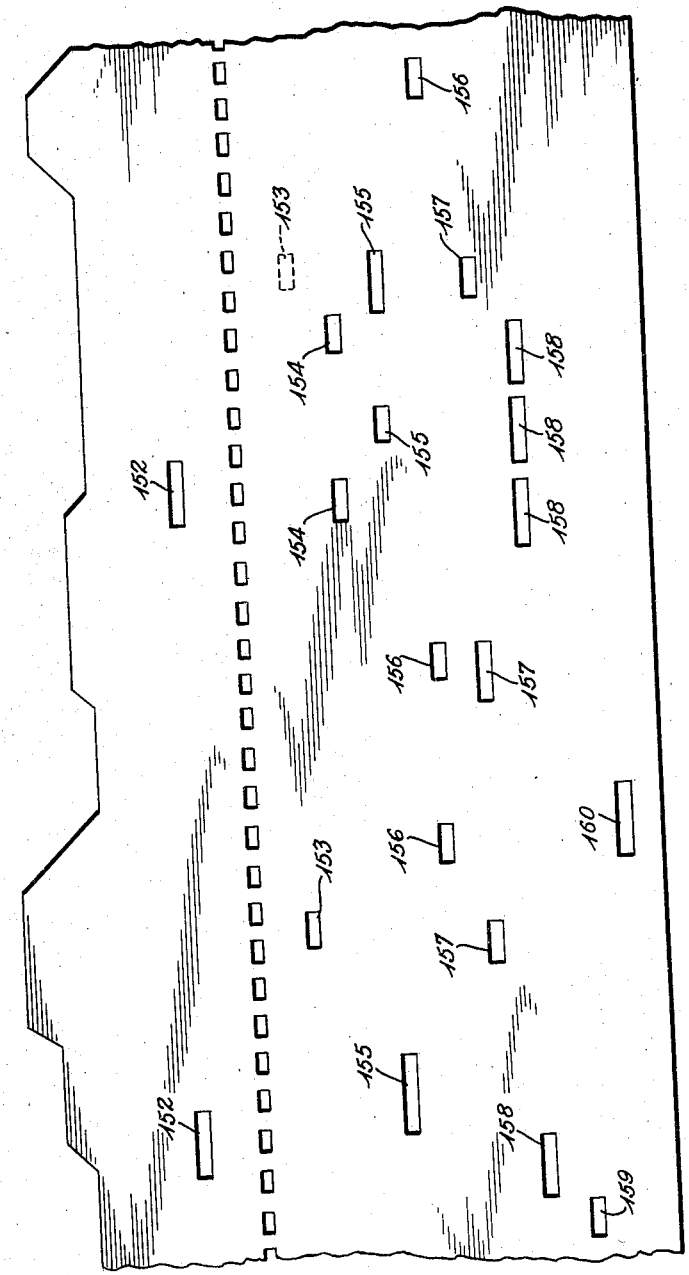

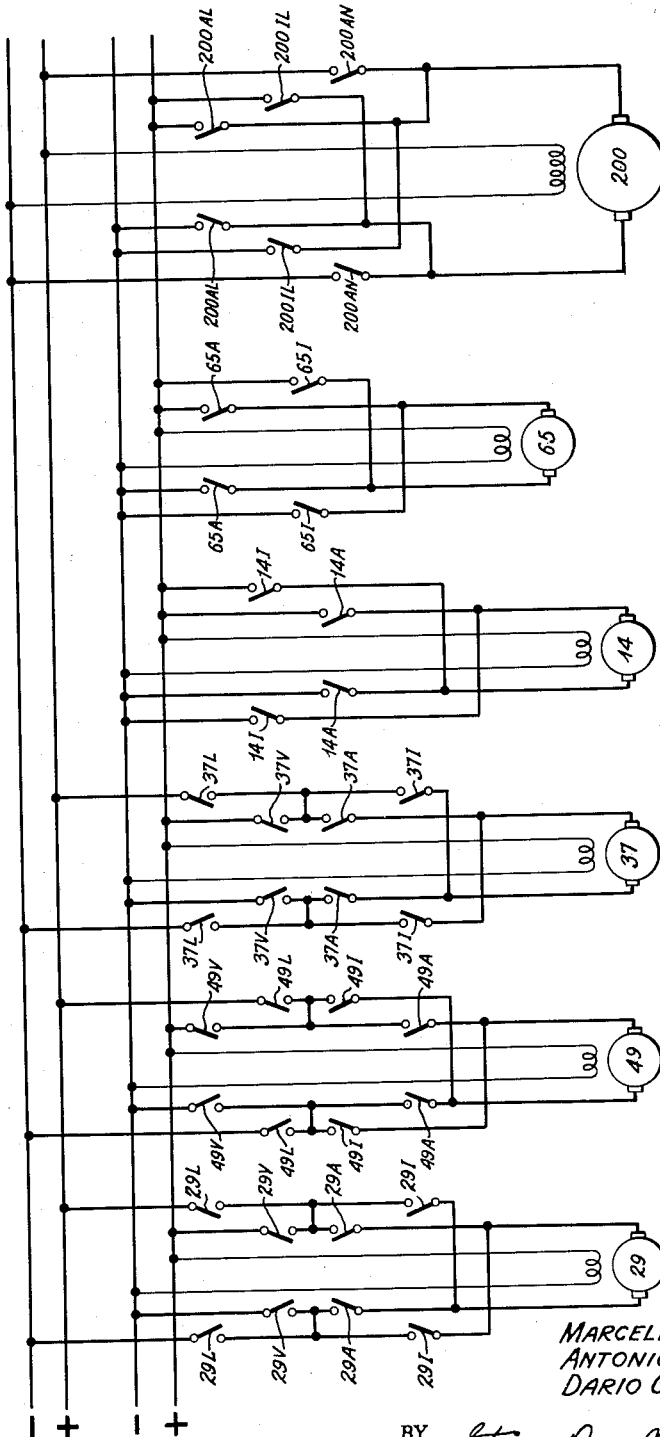

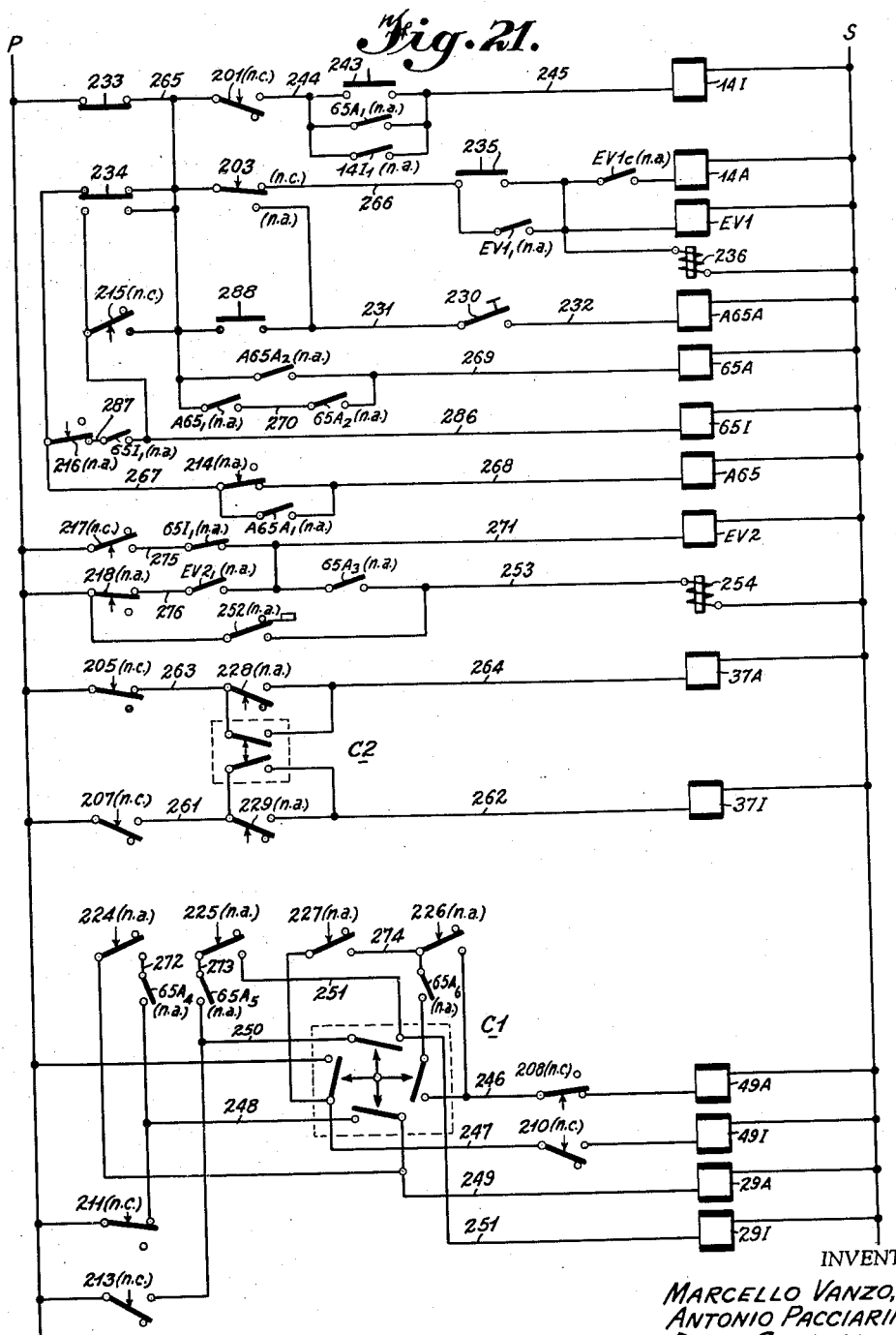

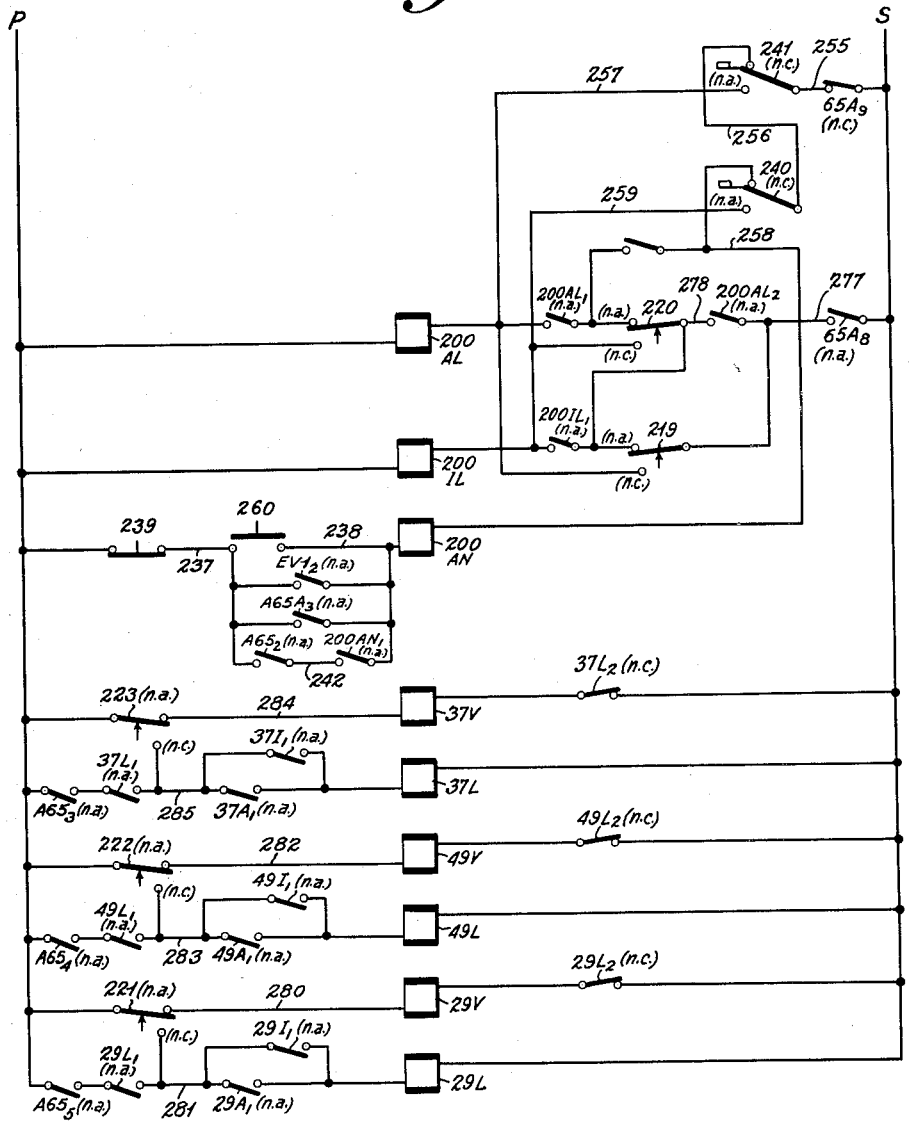

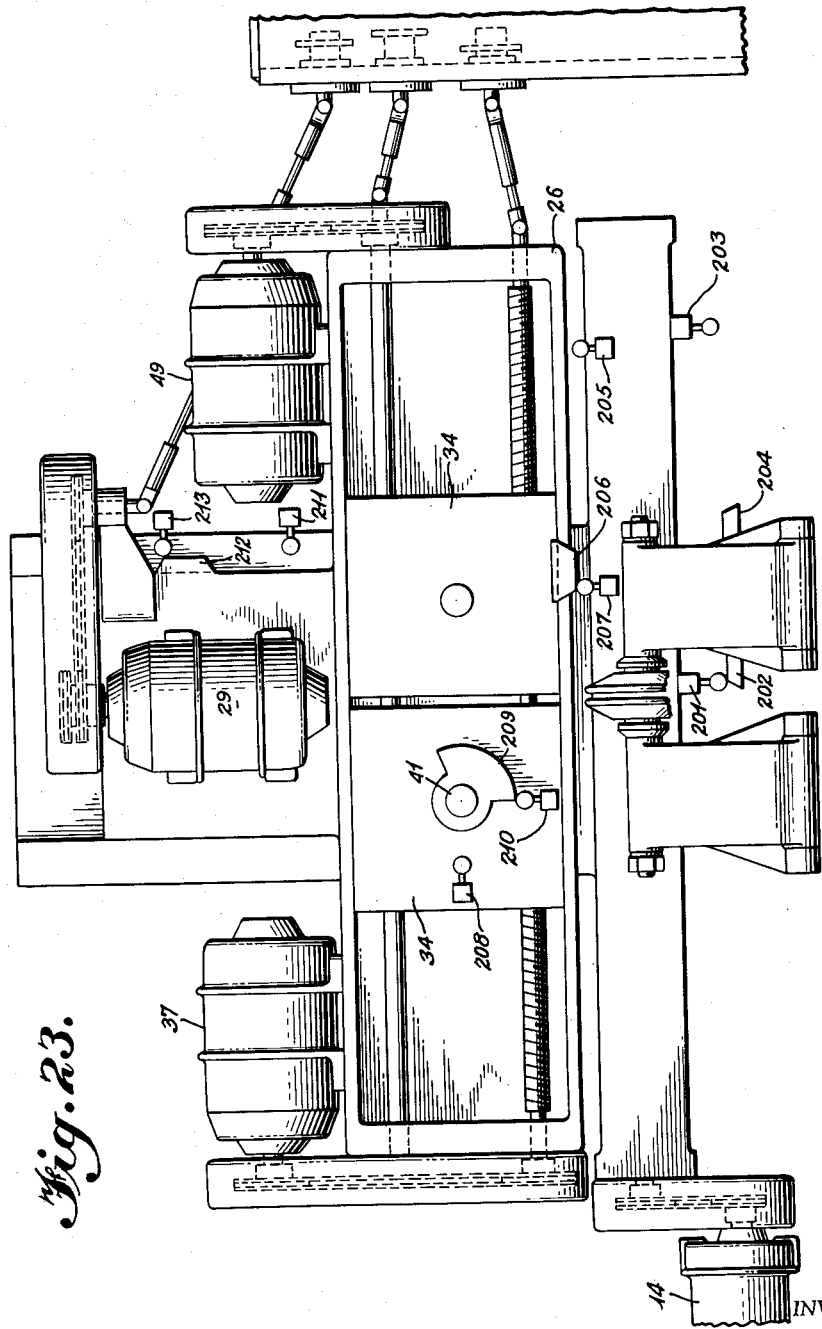

United States Patent Office

2,994,024
Patented July 25, 1961

1

2,994,024
APPARATUS FOR THE AUTOMATIC CONTROL OF MACHINE MOVEMENTS
Marcello Vanzo, Antonio Pacciarini, and Dario Giletta, Milan, Italy, assignors to Pirelli S.p.A., Milan, Italy
Filed Mar. 13, 1957, Ser. No. 645,860
Claims priority, application Italy Mar. 16, 1956
9 Claims. (Cl. 318—162)

The present invention relates to an automatic control for the various movements of given parts of machines used in the manufacture of tires of all types and, more particularly, to an automatic control which precisely corresponds to the sequential operations such as would be manually carried out by a workman specialized in this type of work.

As is known to those skilled in the art, the building of pneumatic tires is normally effected on a rotary tire-building drum of cylindrical shape, having rounded shoulders in the case of tires of standard sizes, or provided with an undercut in the case of large-size tires, on which are wrapped two or more plies of rubberized fabric, the fabric being a "cord" fabric of the weftless type.

These plies have a width substantially in excess of the length of the drum, and the lateral edges of the ply material, which extend beyond the two sides of the drum, are folded about the rounded shoulders of the drum towards its axis of rotation (ply turn-down operation).

Upon completion of the folding of the tire fabric, a pair of metallic rings covered with rubber are applied to the folded plies at the ends of the drum and serve as a means upon which the bead of the tire casing may be conveniently formed. The marginal portions of the fabrics which extend outward from the ring assemblies, after the positioning thereof, are then turned back around said rings in a direction opposite to the direction of previous folding, thus forming a sort of loop which firmly secures the rings to the cylindrical part of the carcass (ply turn-up operation). Over this first set of two or more plies there is then applied a second set of two or more plies the lateral edges of which are folded over in registry with the shoulders of the drum around the previously applied laminations of ply material and bead rings. The tire is then completed by placing over the plies arranged in this manner one or more strips of rubberized cloth constituting the intermediate belting or breaker structure and the rubber band constituting the tread, which must then be stitched to improve the compactness of the assembled structure as a whole.

The number of plies and of rings and the sequence followed in combining these elements and in folding the plies before and after the application of the rings vary naturally with the variation of the size and type of the tires.

While the application of the plies onto the drum is normally effected by hand, in order to cause the plies to adhere to each other and eliminate any possible inclusions of air between them, and in order furthermore to effect the turn operations of the edges of said plies on the shoulder of the drum, there have been proposed various automatic compacting or stitching devices which permit a substantial saving in time and uniformity of results.

These devices comprise one or more pairs of discs or rollers which perform motions which must take place in accordance with a predetermined sequence. In order to prevent one of these movements from starting before the previous movement has been completed, there are normally used limit switches which must be adjustable both to regulate the path of the stitching rollers and to vary said paths upon a change in the size of the tires to be built.

2

For the building of tires on drums with rounded shoulders, in order to be able to make automatic all the operations necessary for the building of a tire having only a single ring per bead, the difficulty resulting from the limited space available around the moving parts for the installment of said limit switches has been surmounted by recourse to a centralized control consisting of a drum rotating at a predetermined velocity and bearing a series of pointers each of which controls a switch. In this way, it has been possible to increase the number of operations effected automatically, but the machine has thereby also been made more complicated since the switches controlled by the timing device had to be made to agree with the limit switches which it was necessary to leave on the machine itself.

The machine is still further complicated by the necessity of carrying out the various operations separately when the machine is to be adjusted for a new size, or in the event that the manufacture of the tire must be interrupted and resumed subsequently due to defects encountered during the manufacture and which must be eliminated by direct intervention on the part of the operator. For the building of tires of larger sizes having more rings per bead, which building is carried out on drums having an undercut, the problem of the stitching is substantially more complicated than in the case of tires having a single ring per bead, both because of the much greater number of plies employed (for certain types of tires, the use of up to 14 plies may be necessary) and because of the much more complicated profile of the shoulders which requires various additional movements of the stitcher discs which are described in greater detail below.

It must furthermore be borne in mind that the movements of the rollers vary, in this case, not only with the variation of the sizes of the tires to be built and with the specific characteristics of each type of tire, but also from the first to the last plies which form the tire, and it must also be borne in mind that the said rollers must occasionally be stopped in intermediate positions and be driven in the opposite direction, namely when starting from the rings rather than from the centerline of the tire.

Although there have been designed and constructed machines which can substantially facilitate the stitching of these tires, automatic operation in this case can no longer be obtained by the use of limit switches or the above-described timing device and it is necessary for the operator himself to intervene.

A principal object of the present invention is to provide, for a motor-driven element, a control device including the combination of (a) a movable tape or the like having thereon a predetermined profile and (b) a feeler resiliently urged against the profile of the tape and movable in accordance with the configuration of the profile to control the operation of the motor which drives the element; a particularly novel feature of this control device resides in the fact that the feeler is mounted on a movable slide, the slide being moved by the same motor which is controlled by the operation of the feeler and in a direction tending to shut off the motor.

A further object of the present invention is to provide a control device of the type referred to above which is designed for use in the control of a pneumatic tire-building machine.

The present invention discloses a new method of automatically controlling the movements of given parts of a pneumatic tire-building machine of any type which makes it possible to have said parts carry out predetermined movements, which may be derived directly from the operations carried out manually by a specialized worker and improved upon by experimentation, if necessary, or otherwise determined in any desired manner.

The method in accordance with the invention broadly consists in representing on one or more means adapted to be moved linearly or rotated, for instance a tape of very thin but rigid material or a cam, the various movements which certain parts of a pneumatic tire-building machine must carry out during the various phases of the building of each type of tire, it being possible to derive said movements directly by a suitable recording, from those carried out by the same elements of the machine during the tire building cycle effected in accordance with the skill of the art by a specialized worker and suitably modified to eliminate any possible defects in operation. The method further consists in automatically controlling, on the basis of the movements recorded on said means which are moved linearly or rotated, the parts of the machine in such a manner that they exactly reproduce the said movements for all the tires of a given type, thus limiting the manual labor required of the worker and therefore also improving the quality of the product, which is no longer dependent upon the individual intuition and skill of the worker.

Another object of the present invention consists of a device which automatically controls the various movements of given parts of a pneumatic tide building machine on the basis of one or more diagrams which have been pre-established theoretically or obtained by the direct recording of the operations carried out manually by a specialized worker, effected by means of the device itself wherein the feeler mechanisms have been replaced by recording mechanisms.

The device which is the object of the present invention makes it possible to automatically carry out any stitching operations, and to vary these operations depending on the characteristics and dimensions of the tires, with the use of a very small number of limit switches and without having to have recourse to timing apparatus which are difficult to construct and adjust.

Furthermore, it makes it possible to carry out all the stitching operations necessary for building a tire no matter how numerous they may be or how much they may differ from each other.

It makes it possible to effect very rapidly the changes in the size and type of construction, dispensing with the usual operations for adjustment purposes.

It makes it possible to determine in advance all the aforesaid operations by deriving them from analogous operations carried out by hand and to correct, with great ease, any possible movements which might not be found in practice to be perfect.

It makes it possible to interrupt and resume the automatic operations at any desired time and possibly to supplement them by hand.

These and other advantages will become more evident from the following description read in conjunction with the attached drawings in which:

FIGURE 1 is a horizontal section taken through the axis of a drum for the building of tires having a single ring in which there have been shown diagrammatically the various positions occupied by the pair of discs provided for the stitching of the plies on the flat part of the tire-building drum.

FIGURE 2 is a section similar to that shown in FIGURE 1 in which there have been indicated diagrammatically the variious positions occupied by the second pair of discs provided for the stitching of the plies on the shoulders of the drum and for carrying out the turning out thereof around the rings.

FIGURE 3 is a horizontal section through a tire-building drum, having two or more rings per bead, along its axis of rotation, in which there have been diagrammatically shown the successive positions occupied by the pair of discs provided for the stitching on the shoulders of the drum during the folding of the first two plies.

FIGURE 19 shows a length of control tape with a contoured edge and several series of holes.

FIGURE 20 shows the wiring diagram of the motors of the tire-building machine.

FIGURES 21 and 22 show the diagrams of the electric circuits of the control device.

FIGURE 23 is a plan view of the pneumatic tire-building machine on which there are shown the positions of the limit switches and of the cams which actuate same.

Figure 4:
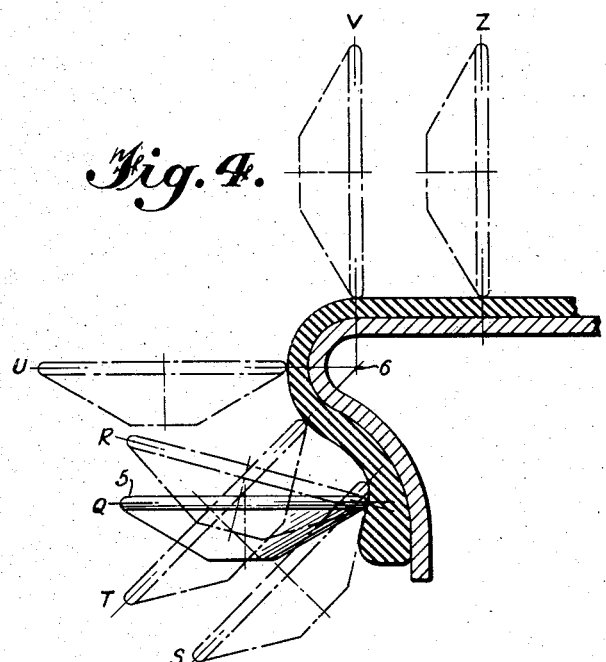
FIGURE 4 is a horizontal section similar to that of FIGURE 3 in which there have been diagrammatically shown the successive positions occupied by the pair of discs provided for the stitching on the shoulders of the drum during the turning out of the first pair of plies around the rings.

As can be clearly perceived from FIGURES 1 and 2, the building of tires having a single ring per bead is carried out by means of a first pair of discs or stitchers 1 which are brought into contact with the plies at the centerline of the tire-building drum. They thereupon move in opposite directions from each other towards the shoulders of the drum and, after having traversed the entire flat portion thereof, continue to move a short distance in the same direction approaching themselves to the axis of rotation of the drum so as to make certain that the edges of the plies will be inclined towards said axis. In FIGURE 1, the path of this first pair of discs has been indicated by A—B. When the discs arrive at positions B, they are removed from the drum and brought back to the centerline of the drum.

FIGURE 2 shows the positions occupied by a second pair of discs 2 during the stitching of the plies on the shoulders of the drum. In the righthand portion of FIGURE 2, there is shown the folding over of the first series of plies effected by one of the discs 2.

The disc 2 is brought into contact with the plies to be folded over in the position C in which it is still on the flat part of the drum. After having traversed the flat portion preceding the shoulder, the disc rotates about the center of curvature of the shoulder 3 to the position D so as to cause the plies to adhere to the shoulder of the drum and is then moved away from the drum and brought back to the starting position C so as to permit the application of the rings.

In the lefthand part of FIGURE 2 there is shown the turn up operation of the plies about the ring 4. This operation is effected by one of the discs 2 after the plies have been diverted towards the outside by a device adapted to this purpose. The disc 2 is brought into contact with the plies in the position E, after having turned about the center of curvature of the shoulder 3 starting from a position symmetrical to position C with respect to the center of the drum. It then stitches the plies, turning up them around ring 4 following the path E—F—G—H—I.

The building of tires of large size also normally requires the use of two pairs of discs: one for the stitching on the flat part of the drum and the second for the stitching on the shoulders of the drum. The operations carried out by the first pair of discs are similar to those described above with reference to FIGURE 1 so that it is unnecessary to repeat them.

FIGURE 3 shows the successive positions occupied by one of the discs 5 of said second pair used for building tires of larger size. This disc is shown during the folding of the first series of plies around the shoulders of the building drum provided with an undercut. The disc 5 is brought in contact with the plies in position L, passes over the flat path L—M parallel to the axis of rotation of the drum, rotates through a certain angle in counterclockwise direction around a first center of curvature of the shoulders 6, reaching the position N and then moves towards the axis of rotation of the tire-building drum, at same time rotating in clockwise direction until reaching the position shown at O. From position O to position P, the disc 5 moves normal to the axis of rotation of the drum, remaining at all times parallel to the latter. After having reached position P, the disc 5 is moved away from the plies and returned to the position corresponding to L so that it does not impede the application of the rings.

In FIGURE 4, there are shown the various positions occupied by one of the discs 5 during the turn down operation of the first pair of plies around the ring which is applied after the above-described stitching. The disc 5 comes in contact with the plies at position Q, thereupon rotates through a certain angle in clockwise direction until it reaches position R and moves away from the axis of rotation of the drum rotating at the same time in counterclockwise direction until it reaches position S. This operation causes the plies to adhere firmly to the ring and avoids the possible inclusion of air. The disc 5 then moves away from the axis of rotation of the drum without rotating until it reaches the position T; it then rotates in clockwise direction about the center of curvature of the shoulders 6 until it reaches the position V and then moves parallel to the axis of rotation of the drum to position Z.

Figure 5:
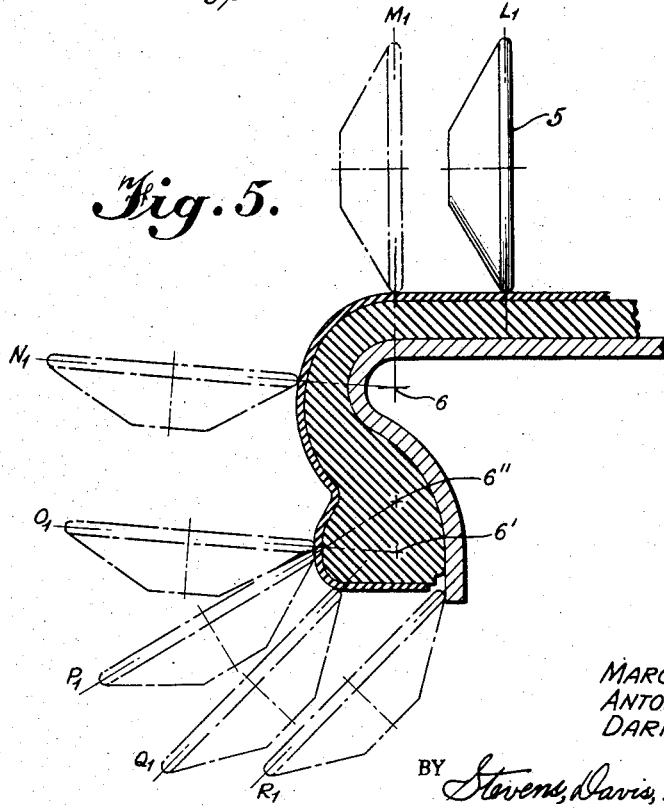
FIGURE 5 is a horizontal section similar to that of FIGURE 3 in which there have been diagrammatically shown the successive positions occupied by the pair of discs provided for the stitching on the shoulders of the drum during the turning down of the last pair of plies.

In FIGURE 5, there is shown the positions occupied by one of the discs 5 during the turn-down operation of the last pair of plies. The disc 5 comes into contact with the plies at the position $L_1$, traverses the path $L_1$—$M_1$ parallel to the axis of rotation of the drum, and rotates through a certain angle in counterclockwise direction around the center 6 until it reaches the position $N_1$. It then approaches the axis of rotation of the drum while remaining parallel thereto until it reaches the position $O_1$. It thereafter rotates through a given angle in counterclockwise direction without changing its distance from the axis of rotation of the drum until it reaches the position $P_1$. Upon further rotation, again in counterclockwise direction, around the shoulder 6′, the disc 5 reaches position $Q_1$ and from there it moves by linear motion parallel to the axis of rotation into position $R_1$, without rotating.

For the folding of the plies, between the first and the last series of plies, the discs 5 occupy positions different from those indicated for the two limit cases shown in FIGURES 3 and 5, and describe trajectories intermediate between those pointed out in the said figures.

The present invention can be applied to any pneumatic tire-building machine; in the following description, however, reference will be had to the more complicated case involving the building of tires having a plurality of rings per bead, which are stitched by two pairs of discs in accordance with the diagrams shown in FIGURES 1, 3, 4 and 5.

Figure 6:
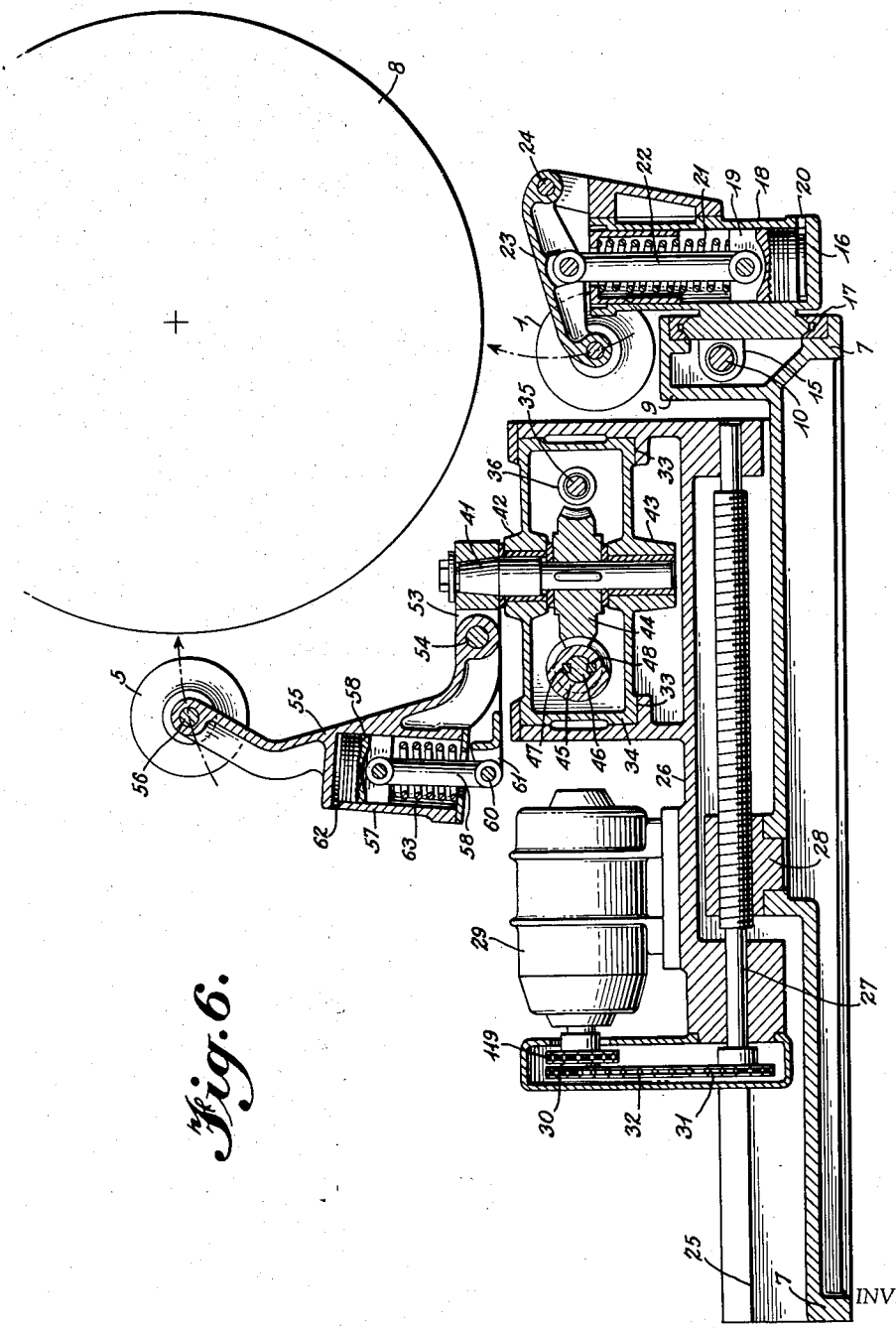
FIGURE 6 is a side view in section of an apparatus for the stitching of the plies comprising two pairs of stitcher discs.
Figure 7:
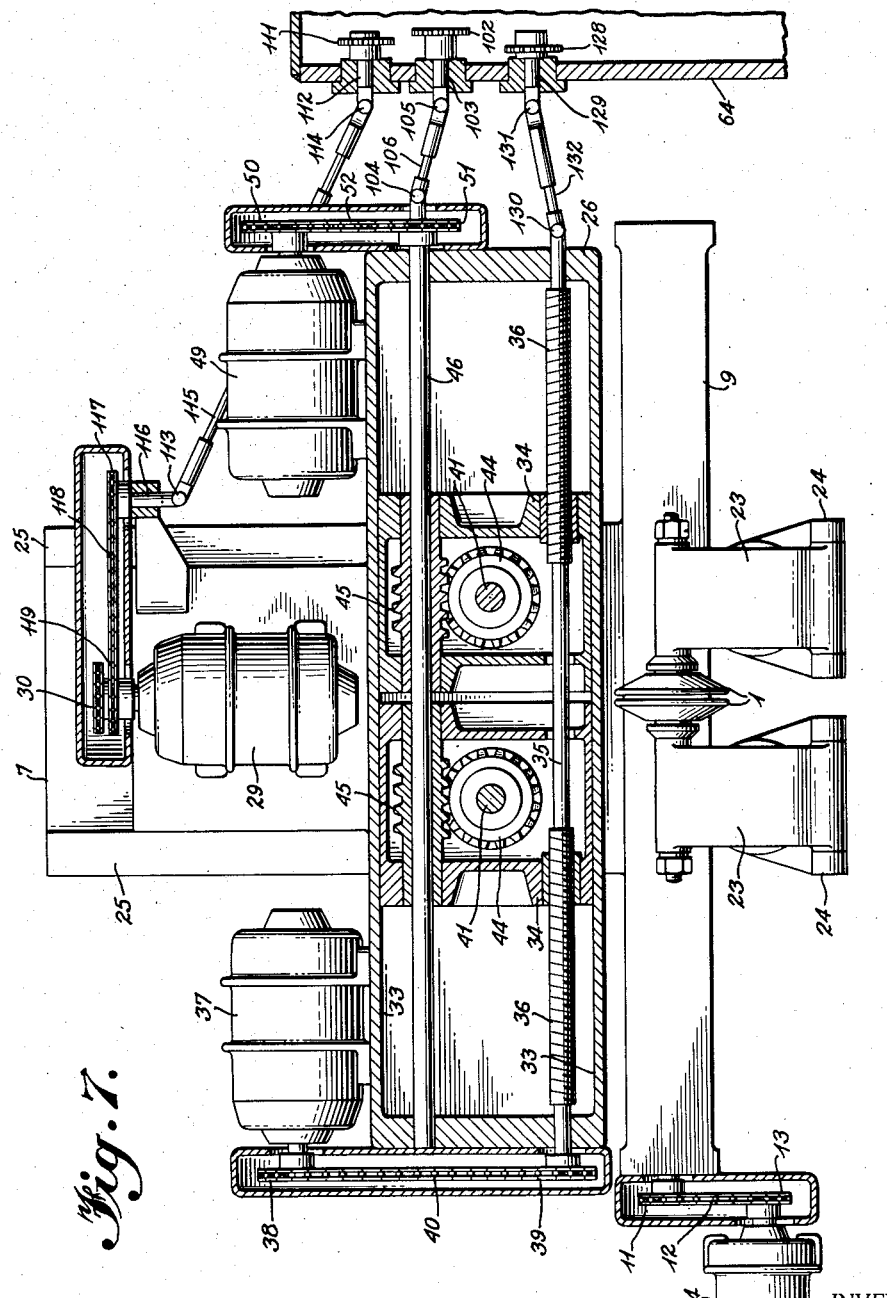
FIGURE 7 is a plan view and section of the stitching apparatus shown in FIGURE 6.

In FIGURES 6 and 7, there is shown in elevation and in plan view, respectively, a stitching device suitable for this purpose. It consists of a strong base plate 7 having mounted on the front part thereof the apparatus including the discs 1 for the stitching on the flat part of the tire-building drum 8 starting from the centerline of the drum and extending towards its shoulders. This apparatus comprises a housing 9 in which there is provided a screw 10 arranged parallel to the axis of rotation of the drum 8. The screw 10 is supported at the ends of housing 9 so as to be able to turn freely. It comprises two sections with righthand and lefthand threads respectively. To one end of the screw 10 there is keyed a gear 11 which is connected by means of a chain 12 with the gear 13, keyed onto the shaft of the reduction motor 14. The reduction motor 14 can control the rotation of the screw 10 in both directions. The screw 10 engages in the female threads 15 which form part of two supports 16 which slide in opposite directions along the screw 10 in the guides 17. In the slidable support 16, there are provided the cylinders 18, which house the pistons 19, which are provided with openings 20 for the admission of a compressed fluid. Springs 21 retard the upward motion of the pistons 19 and assure their return to the starting position when the compressed fluid is discharged from the cylinders. On the pistons 19 there are pivoted links 22 having arms 23 pivoted at the other ends thereof. The arms 23 are, in turn, pivoted at 24 on an extension of supports 16 and bear at the free end the pins on which are mounted discs 1.

The base plate 7 carries at its sides two guides 25 along which a carriage 26 can move in the direction normal to the axis of rotation of the drum 8. In order to control this motion, there is provided, in the lower part of carriage 26, a screw shaft 27 which engages in female thread 28. Said screw shaft is caused to rotate in both directions by motor 29 through the agency of gears 30 and 31 and chain 32.

At both sides of carriage 26 there are recessed two guides 33 in which two housings 34 slide in opposite direction, parallel to the axis of rotation of the drum 8.

In order to control this movement, there is provided a screw shaft 35 supported at its ends by the bed 26 and consisting of two sections with righthand and lefthand thread, respectively. The screw shaft 35 engages in the female threads 36 which are rigidly fastened to the housings 34. The rotation of the screw shaft 35 is controlled by the motor 37 by means of the gears 38 and 39 and the chain 40.

Within the housings 34, the rotatable vertical shafts 41 are mounted between two supports 42 and 43 which are integral with the said housings.

On the central part of the shafts 41, there are mounted the worm wheels 44 which are rotated in opposite directions by worms 45, which are supported by the housings 34. The worms 45 have oppositely-directed threads and are mounted on the shaft 46 along which they can move axially and rotate together with the shaft 46. The worms are driven by the keys 47 and 48, each of which engages along one of the generatrices of the shaft 46. The shaft 46 is supported at its ends by the carriage 26 and its rotation in both directions is controlled by the motor 49 through the gears 50 and 51 and the chain 52.

On each shaft 41, there is mounted a fork 53 which supports a horizontal pin 54, on which there is pivoted an arm 55. On the top of the arm 55, there is fastened the disc 5 which is rotatable around the pin 56. Rigidly connected also with the arm 55, there is a cylinder 57, in which there is mounted a piston 58. On this piston there is pivoted a link 59, which is pivoted at the opposite end on a pin 60, which is supported by a fork 61, which is integral with the support 53. The cylinder 57 is provided with an opening 62 for the admission of a fluid under pressure and is also provided with a spring 63 which opposes the movement of the piston 58 towards the lower part of the cylinder 57.

The operation of the above-described stitching apparatus is as follows:

(1) The discs 1 are in the rest position, corresponding to the centerline A of the tire-building drum (see FIGURE 1) and at a certain distance therefrom. Upon the introduction of fluid under pressure into cylinder 18, the discs 1 are pressed against the plies on the drum and upon actuation of the motor 14, the rotation of the screw shaft 10 causes a displacement of the discs 1 along the paths A—B. When the discs 1 have reached the positions B, the fluid under pressure is discharged from the cylinder 18 and the discs 1 are moved away from the plies. The motor 14 then operates in the direction opposite to the preceding direction and brings the discs 1 back to the position corresponding to the centerline of the tire-building drum.

(2) When the discs 5 are in rest position, they are in a position corresponding to position L in FIGURE 3 at a certain distance from the tire-building drum. Upon the admission of fluid into the cylinders 57, the discs 5 are pressed against the plies which are to be stitched. They can be displaced, depending on the contour of the plies to be stitched, along trajectories which correspond to the following individual movements or the simultaneous combination of said movements:

Linear movement in opposite directions parallel to the axis of rotation of the tire-building drum upon the actuation of the motor 37 which, by rotating the screw shaft 35 causes the housings 34 to move in opposite directions.

Rotational movement in both directions around a vertical shaft upon the actuation of the motor 49, which, by rotating the shaft 46, causes the shafts 41 which carry the supporting arms 55 of discs 5 to rotate in opposite directions.

Linear movement in two directions normal to the axis of rotation of the tire-building drum upon the actuation of the motor 29, which, by rotating the screw shaft 27, causes the carriage 26 to slide along the guides 25.

These operations heretofore were controlled manually by an operator by means of a lever which, depending on the position in which it is placed, controls, individually or simultaneously, electric contacts connected to the motors 29, 37 and 49 and the solenoids which regulate the introduction and discharge of fluid under pressure from the cylinders 57.

Figure 8:
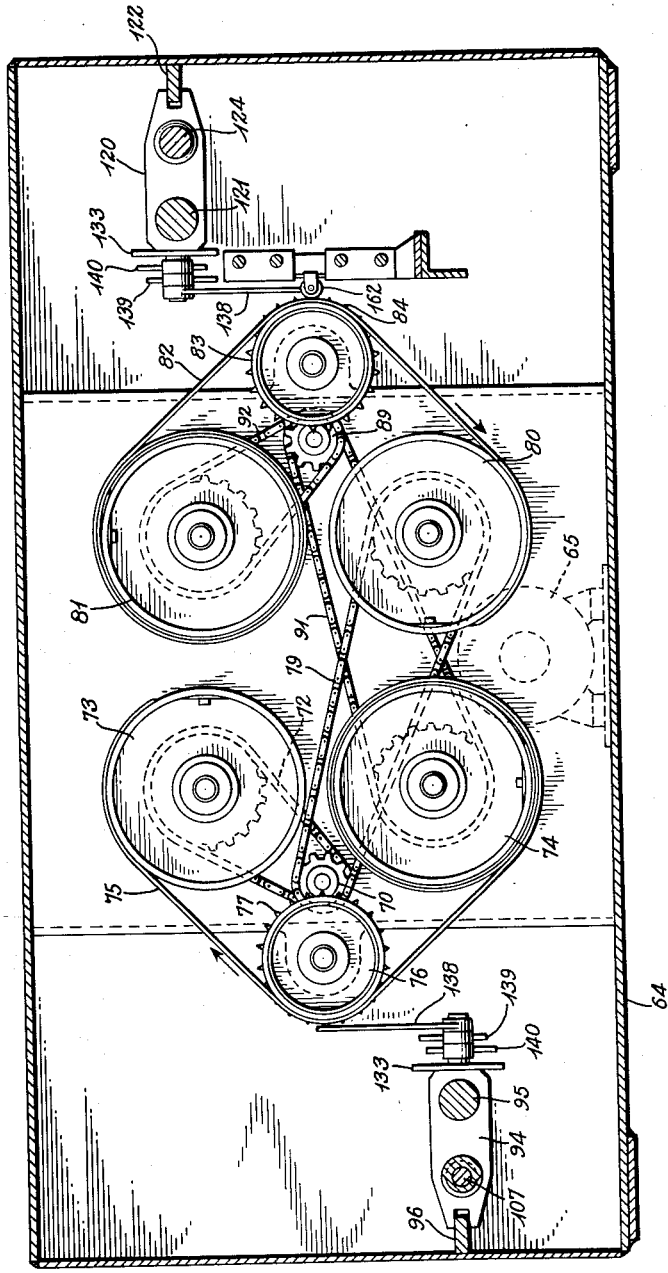
FIGURE 8 is a vertical section of the apparatus serving for the recording and automatic control of the movements of given parts of the tire-building machine, as derived from the operations carried out by the manual control of a specialized tire-building worker.
Figure 9:
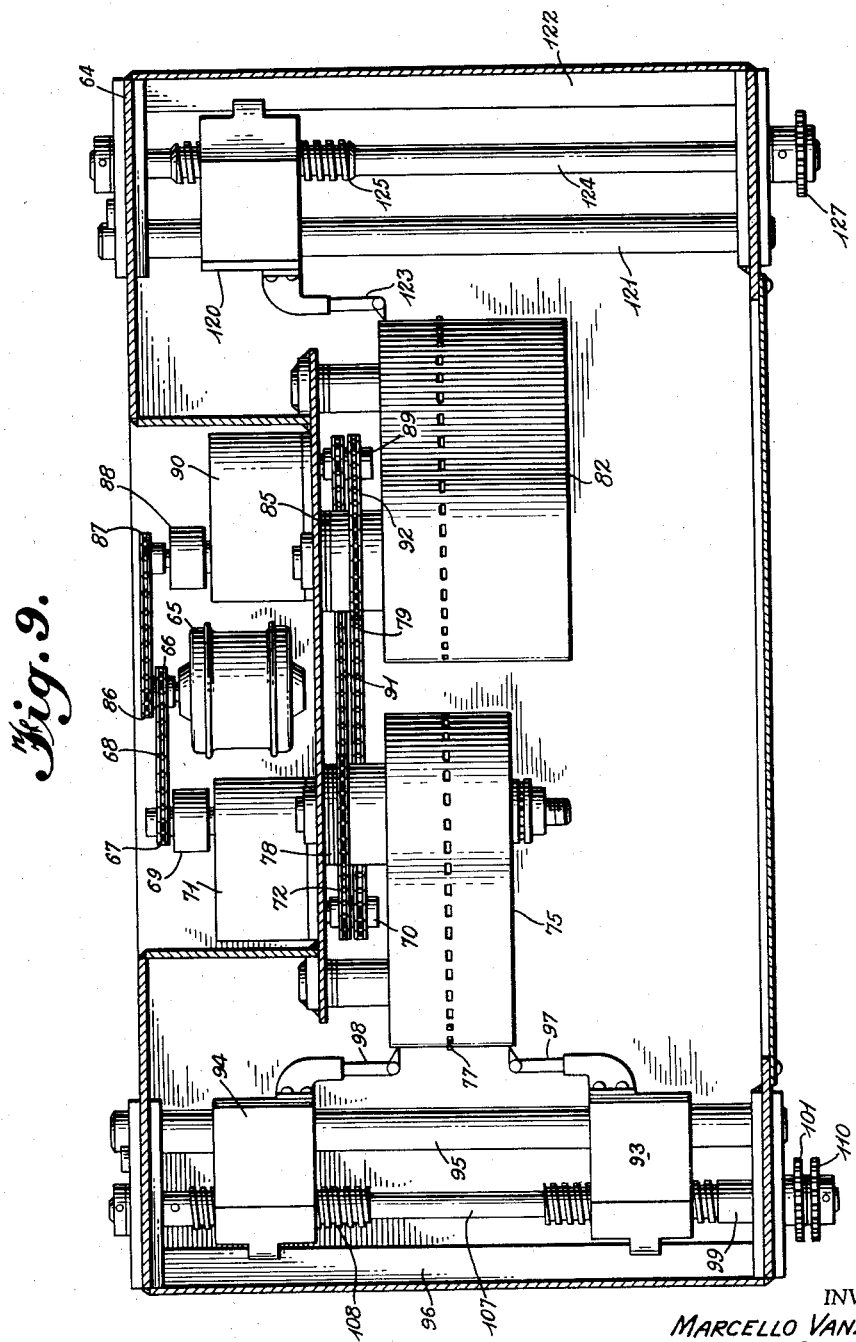
FIGURE 9 is a plan view of the apparatus as shown in FIGURE 8.
Figure 10:
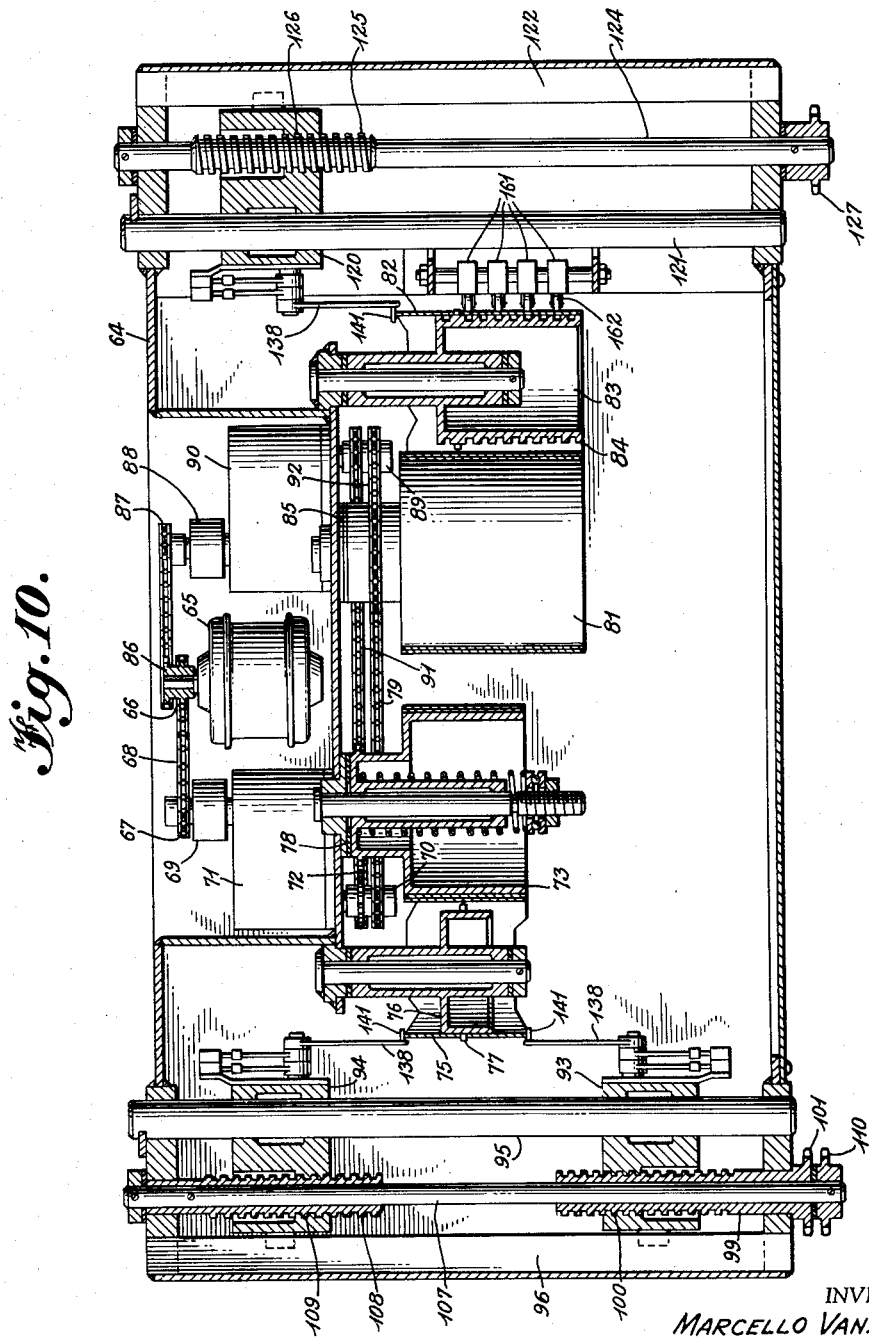
FIGURE 10 is a plan view, partly in section, of the apparatus serving for automatically controlling certain elements of the tire building machine in such a manner that they precisely reproduce the various operations recorded on the two tapes.

The recording of the movements carried out by the operator to build the tires by manual control is effected on two tapes by means of the apparatus shown in FIGURES 8, 9 and 10.

This apparatus consists of a housing 64 in which there is mounted a motor 65 which by means of gears 66 and 67 and chain 68 controls the rotation of the driving part of a clutch 69. When the driving part is engaged in the corresponding driven part of the clutch 69, the motor 65 controls the rotation of a freewheel 70 by means of a reduction drive 71 shown diagrammatically. The freewheel 70, in turn, by means of a chain 72 drives the drum 73 in a clockwise direction. Below the drum 73, there is provided a drum 74 identical to drum 73. On the drum 74 there is wound a tape 75 of very thin but strong material, along the central face of which there is provided a series of equidistant holes. Symmetrically with respect to the drums 73 and 74, there is located a guide drum 76, which is provided with a series of teeth 77 spaced equidistant along the central part of its outer surface. These teeth correspond to the holes provided on the central part of the tape 75 and they mesh therein in order to assure the centering of the tape on the drum 76. While the drums 73 and 74 may be alternately braked by a friction clutch, the drum 76 always idles. In FIGURES 9 and 10, only the friction clutch 78 for drum 73 is shown.

The freewheel 70, by means of a chain 79, also drives the drum 80 in a clockwise direction. Above drum 80 there is located a drum 81 identical to the drum 80. On drum 81 there is wound a tape 82 analogous to the tape 75 wound on drum 73. Symmetrically positioned with respect to the drums 80 and 81, is a guide drum 83 which is provided, in the same manner as drum 76, with a series of teeth 84 arranged at an equal distance from each other along the central part of its outer surface. While the drums 80 and 81 may also be alternately braked by means of a friction clutch, the drum 83 always idles. In FIGURES 9 and 10, only the friction clutch 85 for the drum 81 is shown.

The motor 65, by means of the gears 86 and 87 and their connecting chain, can also rotate the driving part of a clutch 88. When this driving part is engaged in the corresponding driven part of the clutch 88, the motor 65 rotates a freewheel 89 through a reduction drive 90, shown diagrammatically. The freewheel 89, in turn, by means of a chain 91 rotates the drum 74 in a counterclockwise direction and, by means of a chain 92, rotates the drum 81 in a counterclockwise direction.

When the tapes 75 and 82 are to be wound on the drums 73 and 80, respectively, the free ends of the said tapes are placed on the drums 76 and 84 and are hooked onto the drums 73 and 80. Thereupon the clutch 69 is actuated so that the motor 65 drives the freewheel 70 which, in turn, rotates the drums 73 and 80. The latter exert a pulling action on tapes 75 and 82, respectively, while the drums 74 and 81 are braked by the corresponding friction clutches to compensate for the differences between the peripheral speed of each tape on its respective drum due to the difference in diameter of the tape wound thereon. The drums 74 and 81 can rotate since the freewheel 89 is allowed to freely rotate in clockwise direction.

When the tapes 75 and 82 must be passed respectively from drums 73 and 80 to drums 74 and 81, the clutch 88 is actuated so that the motor 65 drives the freewheel 89 which, in turn, rotates the drums 74 and 81. The latter exert a pull on tapes 75 and 82, respectively, while drums 73 and 80 are braked by the corresponding friction clutches for the reason indicated above. The drums 73 and 80 can rotate since the freewheel 70 can freely rotate in counterclockwise direction.

Two supports 93 and 94 which can slide along the guide 95 and are guided by the bar 96 bear the styluses 97 and 98, respectively. The support 93 is displaced along the guide 95 by the rotation of the hollow threaded shaft 99 which engages in a corresponding female thread provided on the inside of the support 93. To one end of the hollow threaded shaft 99 there is keyed a gear 101 which is driven by means of a chain not shown in the drawing by the gear 102 (FIGURE 7) mounted on the shaft 103 supported by the housing 64. The shaft 103 is connected, by the universal joints 104 and 105 and shaft 106, to shaft 46 which effects the rotation of the shafts 41 in opposite directions and therefore effects the rotation of the supporting arms of the discs 5 in opposite directions.

The support 94 is displaced along the guide 95 by the rotation of shaft 107 on which there is fastened a threaded sleeve 108 which engages in the corresponding female thread provided within the support 94. To one end of the shaft 107 there is keyed a gear 110 which is connected by means of a chain, not shown in the drawing, to the gear 111 keyed to the shaft 112 which is connected by means of the universal joints 113 and 114 and the shaft 115 to the shaft 116. The shaft 116 carries, keyed to one end, the gear 117 which is connected by a chain 118 to the gear 119 keyed to the shaft of the motor 29 which controls the movement of the carriage 26 in a direction normal to the rotational axis of the tire-building drum.

The support 120, analogous to the supports 93 and 94, can slide along the guide 121, guided by the bar 122, and bears the stylus 123. The support 120 is displaced along the guide 121 by the rotation of the shaft 124 which bears a threaded portion 125 which engages in the corresponding female thread 126 provided in the inside of support 120. To one end of the shaft 124, there is keyed a gear 127 which is connected by a chain not shown in the drawing to the gear 128 keyed to the shaft 129 which is connected, by the universal joints 130 and 131 and the shaft 132, to the screw shaft 35 which controls the displacement in opposite directions of the housings 34 parallel to the axis of rotation of the tire-building drum.

The movements carried out by the pairs of discs 5 during the building of a tire and effected by the manual control of a specialized worker are recorded on tapes 75 and 82 by the above-mentioned devices. To accomplish this operation, the styli 97 and 98 are brought into contact with the tape 75 and the stylus 123 is brought into contact with the tape 82, each in a position corresponding to a line parallel to the direction of linear motion of the corresponding tape, which will hereinafter be called the "reference line" and which corresponds to the initial position of the discs 5. The motor 65 is then actuated so that the tapes 75 and 82 are unwound from the corresponding drums 74 and 81. When the operator causes the discs to move parallel to the axis of rotation of the tire-building drum by actuating the motor 37, the screw shaft 35 transmits a rotating motion to the shaft 124 and causes the displacement of the support 120. The latter in this way moves the stylus 123 away from the reference line, causing it to trace an inclined line with respect to the latter and the inclination of the traced line depends solely on the linear speed of the discs 5 parallel to the rotational axis of the tire-building drum 8, if the advancing speed of the tape 82 is at all times constant. If the worker at a certain point shuts off the motor 37, the stylus 123 traces a straight line parallel to the reference line at a distance from the latter which corresponds, in accordance with a given ratio, to the amplitude of the movement effected by the discs during the above-described operation. If the operator again actuates the motor 37 but in the opposite direction, in order to bring the discs back to the starting position with the same speed with which the previous motion was effected, the stylus 123 moves back to the reference line, tracing a line which is inclined with respect to the latter and the inclination of the traced line will be equal and opposite to that of the first inclined line.

Analogous curves will be traced by the styli 97 and 98 on the two sides of the tape 75 when the operator actuates the motors 29 and 49 so as to displace the discs normal to the axis of rotation of the tire-building drum or cause them to rotate around the shafts 41.

In order to obtain a good stitching of the plies, it may be necessary that the discs pass over the above-described paths with different speeds in the individual paths. In particular this applies to operations involving the folding of the plies and the turn-down thereof, which require a slower stitching in the path corresponding to the part of the shoulders extending inwardly toward the rotational axis of the drum.

If the motors 29, 37 and 49 do not permit variations in speed, in order to effect a stitching operation for a period of time greater than that which would be used when the motor provided for this operation is operated continuously, the operator must have recourse to the intermittent operation of said motor. Therefore, the profile traced by the stylus in this case will no longer consist of a single straight line of an inclination corresponding to the single speed of the motor for each tire-building phase, but of a broken line consisting of straight line sections, all of which have the said inclination, connected together by sections parallel to the reference line which corresponds to the periods during which said motor is at rest.

In order to make the recording of the three movements of the discs 5 controlled by the motors 29, 37 and 49 clearer, it is believed advisable to describe the recording of the stitching operations shown diagrammatically in FIG. 5.

Figure 11:
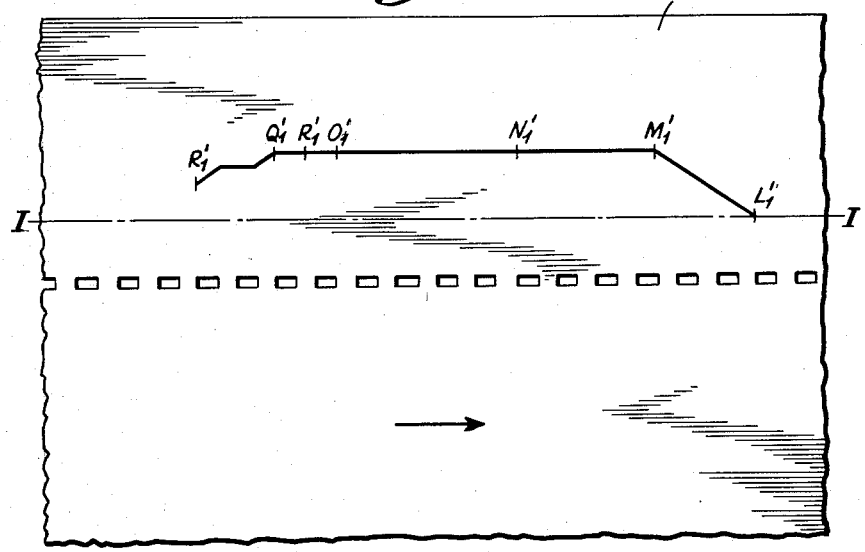
FIGURE 11 shows a length of tape on which there have been recorded the linear movements carried out by the discs for the stitching on the shoulders of the drum parallel to the axis of rotation of the the tire-building drum.
Figure 12:
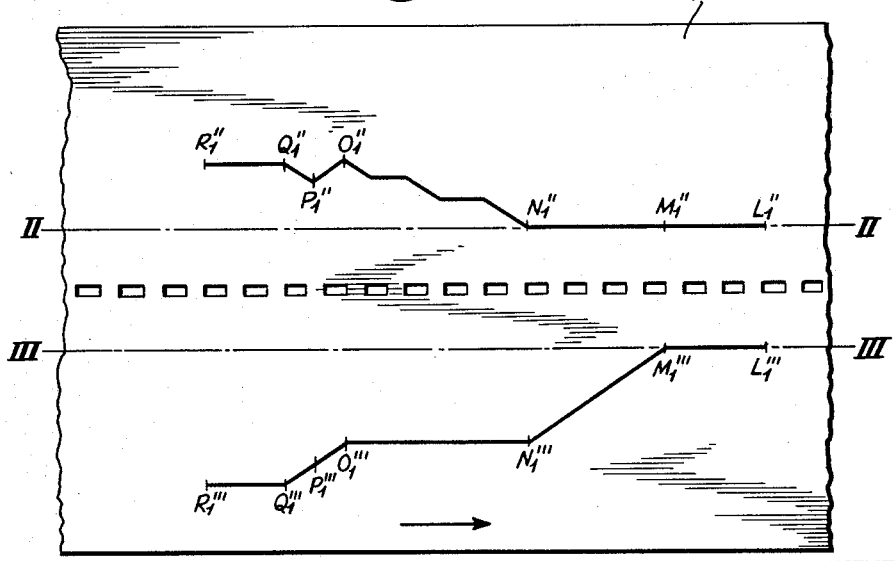
FIGURE 12 shows a length of tape on which there have been recorded the linear movements normal to the axis of rotation of the tire-building drum and rotational movements about a vertical axis of the discs for the stitching on the shoulders of the drum.

The profiles traced by the styli 97, 98 and 123 during this operation on the two edges of the tape 75 and on one of the edges of the tape 82 are shown in FIGS. 11 and 12. In FIG. 11 there is shown a part of the tape 82 on which the stylus 123 has traced the profile corresponding to the movements of the discs 5 parallel to the axis of rotation of the tire-building drum, controlled manually by means of the motor 37.

In FIG. 12 there has been shown a part of the tape 75 on which the styli 98 and 97 have traced on the upper and lower parts respectively, the profiles corresponding to the linear movements of the discs 5 normal to the axis of rotation of the tire-building drum and to the rotational movements of the latter around the shafts 41, controlled manually by means of the motors 29 and 49 respectively.

The capital letters given in the diagram correspond to the positions of the discs designated in FIG. 5 by the same letters.

In order to cause the discs 5 to move over the path $L_1$—$M_1$ parallel to the axis of rotation of the tire-building drum, the operator actuates the motor 37 and the stylus 123 traces on tape 82 (FIG. 11) the inclined line $L_1'$—$M_1'$, starting from the reference line I—I, if the time required for this operation corresponds to that required when the motor 37 is operated continuously. Meanwhile the styli 98 and 97 trace two lines $L_1''$—$M_1''$ and $L_1'''$—$M_1'''$, respectively, which coincide with the corresponding reference lines II—II and III—III. At this point, the operator shuts off the motor 37 and instead of it starts the motor 49 which, by means of the shaft 46, rotates the discs 5 through an angle of almost 90° around the axes of the shafts 41 which during this phase pass through the centers of curvature 6 of the tire-building drum. The shaft 46 transmits its motion of rotation to the hollow shaft 99 and thus causes the displacement of the support 93, on which is mounted the stylus 97, causing the latter to trace a line $M_1''''$—$N_1'''$ having an inclination corresponding to the speed of the motor 49. The stylus 123 will at the same time trace a line $M_1'—N_1'$ parallel to the reference line I—I and the stylus 98 will continue to trace a line $M_1''—N_1''$ coinciding with the reference line II—II.

When the discs 5 have reached the position $N_1$, the operator stops the motor 49 and starts the motor 29 which effects the displacement of the discs in a direction normal to the axis of rotation of the tire-building drum. The motor 29 at the same time rotates the shaft 107 and causes the displacement of the support 94 on which the stylus 98 is mounted. Assuming that in the course of this operation the operator deems it advisable to have the stitching last longer than that contemplated for continuous operation of the motor 29, the stylus 98 in the aforesaid manner traces on the tape 75 (FIG. 12) a broken line $N_1''—O_1''$ in which the sections having an inclination corresponding to the speed of the motor 29 alternate with sections parallel to the reference line II—II. The styli 123 and 97 trace the paths $N_1'—O_1'$ and $N_1'''—O_1'''$, respectively parallel to the relative reference lines. When the discs 5 have reached the position $O_1$, they turn through a certain angle in counter-clockwise direction while the carriage 26 again moves away from the axis of rotation of the drum displacing the axis of the shafts 41 from position 6', which corresponds to $O_1$, to position 6". In order to effect these movements, the operator continues to run the motor 49 in forward direction and at the same time causes the motor 29 to operate in reverse direction; the styli 98 and 97 then trace respectively the section $O_1''—P_1''$, which converges with respect to the reference line II—II, and the section $O_1'''—P_1'''$, which diverges with respect to the reference line III—III, while the stylus 123 traces the section $O_1'—P_1'$ which is parallel to the reference line I—I. In order to bring the discs 5 from position $P_1$ to position $Q_1$, the worker operates both motor 49 and motor 29 in forward direction. The styli 98 and 97 thus trace the two sections $P_1''—Q_1''$ and $P_1'''—Q_1'''$ respectively, which lines are divergent with respect to their reference lines, while the stylus 123 draws the section $P_1'—Q_1'$ which is parallel to its own reference line. When the discs 5 have arrived in the position $Q_1$, the axes of the points 6'. In order to move the discs 5 from position $Q_1$ to the position $R_1$ the operator, after having shut off the motors 29 and 49, operates the motor 37 in reverse direction intermittently in order to prolong the operation for a period of time longer than that corresponding to the continuous operation of the motor. The stylus 123 thus traces the broken line $Q_1'—R_1'$, while the styli 98 and 97 trace, respectively, lines $Q_1''—R_1''$ and $Q_1'''—R_1'''$ parallel to the respective reference lines. When the stitching along the last-mentioned path has been finished, the operator also stops motor 37 and, after having moved the discs away from the plies by discharging the pressure fluid from cylinders 57, he causes the discs to return to the starting position for the next stitching operation.

In addition to the movements of the discs, it may be useful to record on the tapes also the start and termination of other operations, such as the instants when the introduction and discharge of the pressure fluid from the cylinders 57 must be initiated, and the change in speed and direction of the rotation of the tire-building drum. For this purpose other styli may be used, mounted in a manner different from the aforesaid styli so that they do not trace continuous profiles but are brought into contact with the tape, by means of impulses, only at the instants at which the above-indicated changes take place and thus record only short traces.

With the above-indicated recording, profiles are obtained which depend upon the intuition and skill of the operator who has controlled the tire-building phases recorded on the tapes, and therefore it is often advisable to change them in part, correcting their defects, or to prepare other profiles theoretically, based on those which have been recorded.

The automatic control of the various movements of given parts of a pneumatic tire-building machine based on a curve which has been theoretically predetermined or has been obtained by direct recording of the tire-building phases carried out by the manual control of a skilled operator traced with the above-indicated device, can be accomplished with the same device as used for the recording, in which case the recording styli are replaced with feeler mechanisms.

Figure 13:
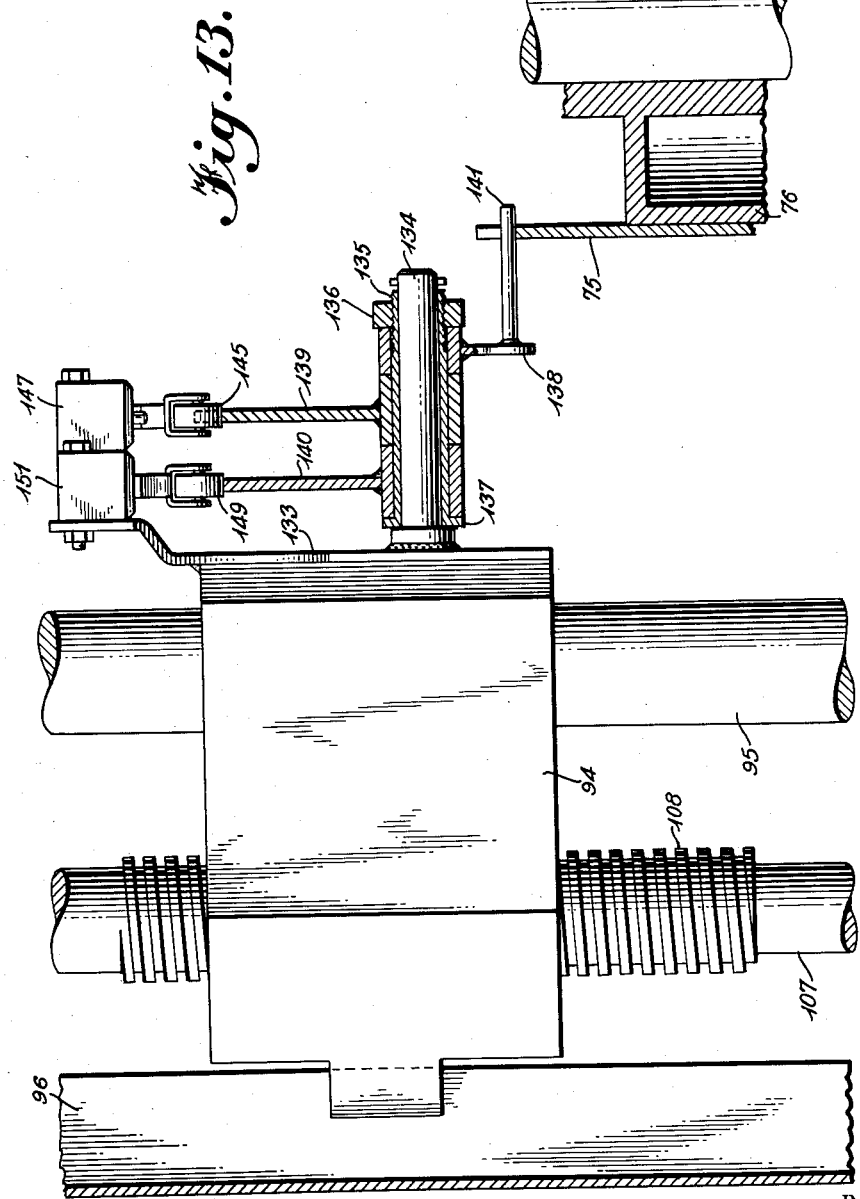
FIGURE 13 is a top view, partly in section, of one of the feeler mechanisms which can be used for the automatic control with constant-speed motors.
Figure 14:
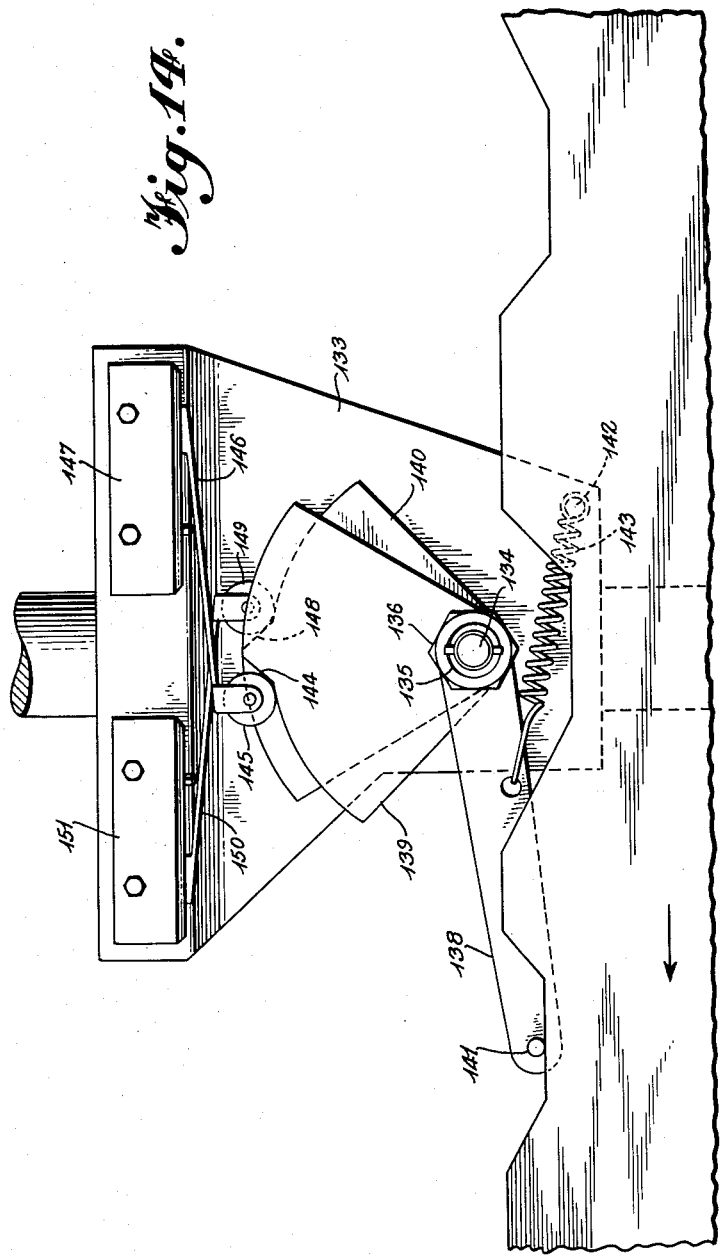
FIGURE 14 is a side view of the mechanism shown in FIGURE 13.

In FIGS. 13 and 14 there is shown, by way of example, one of such mechanisms adapted for automatic drive with motors of one or more constant speeds.

This feeler mechanism comprises a base plate 133 which supports a shaft 134 on which there is rotatably mounted a sleeve 135. The latter is provided at one end with an outer thread on which there is mounted a nut 136 and at the other end with a flange 137. Between the nut 136 and the flange 137 there are mounted, in such a manner as to turn together with the sleeve 135, an arm 138 and two cams 139 and 140. The arm 138 bears a guide 141 fastened to its free end and is connected to a pin 142, which is rigidly connected with the base plate 133, by means of a spring 143, which functions to maintain the guide 141 at all times against the edge of the control tape.

The cam 139 is shaped like two sectors of slightly different radius and with its center on the axis of the shaft 134 and its arcuate edges are connected to each other by an inclined plane 144 which acts on the roller 145 borne by the free end of the control lever 146 of the microswitch 147 fastened to the base plate 133. The cam 140 has a shape identical to that of the cam 139 but is arranged symmetrically and its edges of different radius are connected with each other by an inclined plane 148 which acts on the roller 149 borne by the free end of the control lever 150 of the microswitch 151 fastened to the base plate 133. The microswitch 147 is connected to the forward drive of one of the motors which control the movements of the discs 5 and the microswitch 151 is connected to the reverse drive of the same motor.

The feeler mechanisms are adjusted by regulating the position of the cams, after loosening the nut 136, so that when the guide 141 is in contact with the reference line of the profile of the tape, the inclined planes 144 and 148 are in positions very close to those corresponding to the actuation of the respective microswitches. It is moreover necessary that the distance between the two inclined planes 144 and 148 be minimum in order to make sure that the action of the two microswitches is immediate when the direction of rotation of the arm 138 changes.

More particularly, when the guide 141 rotates in counterclockwise direction around the shaft 134, the cam 139, rotating together with the guide 141 in the same direction, actuates the microswitch 147 by means of the inclined plane 144, causing the roller 145 to ascend to the edge of greater radius. The microswitch 147 then causes the motor controlled by it to rotate in a given direction. When, however, the guide 141 rotates in clockwise direction around the shaft 134, the cam 140, rotating together therewith in the same direction actuates the microswitch 151 by means of the inclined plane 148 causing the roller 149 to ascend to the edge of greater radius. The microswitch 151 then causes the above-mentioned motor to rotate in a direction opposite to the preceding direction.

All the above, of course, applies to all three of the feelers which are associated with the motors 29, 37 and 49.

Since the supports of the feelers are at all times associated kinetically with the various positions occupied by the discs at successive instants by means of the screw shafts 99, 107 and 124 and the transmission mechanisms described in detail above, a well defined position of the supports of the feelers corresponds to each position of the disc. Therefore, a given amplitude of movement of the discs with respect to the starting position corresponds to each distance of the supports of the feelers from the relative reference line.

In view of the foregoing, the control of the discs can be effected in the two following manners:

(A) If the speed of rotation of the motors which control the movements of the discs is maintained constant, there may be the following two alternatives:

(1) The speed of the control motor is such as to displace the support of the feeler with respect to the reference line of the control tape at a speed greater than that which corresponds to the maximum slope provided on the edge of said tape for each operation. In this case the microswitch, which controls the movement being carried out, stops the motor for controlling the discs intermittently, and the feeler stops until the said microswitch is again actuated and the drive motor is again started, the tape continuing to advance. The displacement of the support with respect to the reference line takes place therefore in successive steps.

(2) The speed of the control motor is such as to displace the support of the feeler with respect to the reference line of the control tape at a speed less than that which corresponds to the minimum slope provided on the edge of said tape for each operation. In this case, the microswitch actuates the control motor, the microswitch remaining depressed by the cam with its sector of greater radius, even when the inclination of the profile of the control tape changes until the theoretical straight line on the control tape corresponding to the actual trajectory of the discs intersects the profile of the edge of the control tape. Of course in this case it is necessary that the profile be shaped in such a manner that the section inclined with respect to the reference line be followed by a section parallel to said line which is sufficiently long to permit the feeler to stop when the discs have completed a displacement of an amplitude corresponding to the inclined line in question.

(B) If the motors which control the movements of the discs can vary in speed as a function of the slope of the profile of the control tape, the feeler continuously follows said profile.

From the above it is clear that this system, which we will call "follow-up," is always necessary in order to make certain that the amplitude of the movements of the discs actually corresponds to that predetermined for the individual operations. This system, however, exercises on the control devices an action which differs depending on whether the structural characteristics of the feeler devices correspond to the conditions required in order to effect the follow-up with motors of type A or with motors of type B.

Figure 15:
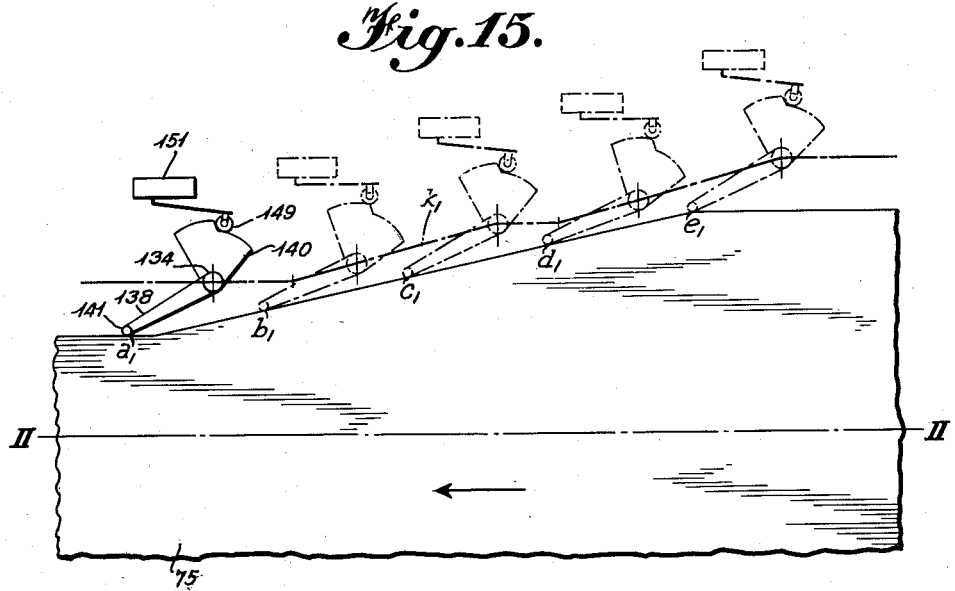
FIGURE 15 shows diagrammatically the various positions occupied by a feeler mechanism in the case of automatic control with a constant-speed motor and a profile tape section which diverges with respect to the reference line with an inclination less than that corresponding to the speed of the motor.

In order to make the concept of the "follow-up" clearer, it is deemed advisable to have recourse to the following examples which refer to a tape with shaped edges:

(I) Speed of the control motor greater than that corresponding to the maximum inclination of the tape. The section of a diverging profile with respect to the reference line (FIG. 15). In this case, until the guide 141 is in contact with the line parallel to the reference line (position $a_1$), the discs are not moved by the motor connected to the feeler which is stopped and thus the support also remains stopped. As soon as the guide 141 arrives at the point of the profile of the tape which corresponds to the start of the divergent section in question, the arm 138 is caused to be rotated by the edge of the tape in clockwise direction around the shaft 134 and the cam 140 causes the roller 149 to ascend from the rest position to the edge of the sector of greater radius (position $b_1$) thus actuating the microswitch, thereby starting the motor. The discs then start their movement with a speed greater than that corresponding to the inclination of the section in question and the support of the feeler also moves away from the reference line with a speed greater than that corresponding to the inclination of the said section until the arm 138, rotating around the shaft 134 urged by the spring 143, causes the roller 149 of the microswitch 151 to return to the edge of smaller radius of the cam 140 (position $c_1$) thus interrupting the operation of the motor. The cam 140 again actuates the microswitch 151 only when the edge of the control tape, which continues to travel at a uniform speed, again rotates the arm 138, moving it way from the reference line (position $d_1$). In this way the drive is discontinuous and the longer the periods of rest of the motor, the greater the difference between the actual inclination of the edge of the control tape and the theoretical inclination corresponding to the speed of the motors that control the discs.

The different successive positions occupied during the advance of the tape by the shaft 134, which is rigidly connected together with the support of the feeler, as a result of the combined effect of the profile of the tape and of the kinetic connection between the rollers and the supports of the feelers, are represented by the broken-line $K_1$ shown in dot-dash line in FIGURE 15.

Figure 16:
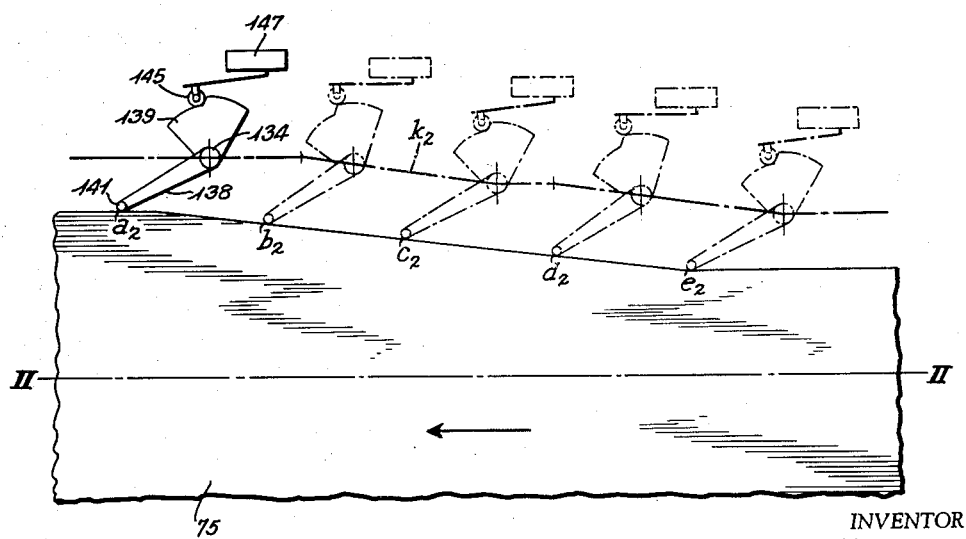
FIGURE 16 shows diagrammatically the various positions occupied by a feeler mechanism in the case of automatic control with a constant-speed motor and a profile tape section which converges with respect to the reference line with an inclination less than that corresponding to the speed of the motor.

(II) Speed of the drive motor greater than that corresponding to that of the maximum inclination of the tape. Profile section of the tape converging with respect to the reference line (FIG. 16).

As long as the guide 141 is in contact with the section parallel to the reference line (position $a_2$) the discs are not moved by the motor connected to the feeler; both the motor and the supports of the feeler are stopped. As soon as the guide 141 reaches the point of the profile of the tape which corresponds to the start of the converging section, the arm 138 rotates in counterclockwise direction around the shaft 134 pulled by the spring 143, and the cam 139 actuates the microswitch 147 causing roller 145 to rise from the rest position on the edge of the sector of greater radius (position $b_2$) and starts the motor. The discs start their movement with a speed greater than that corresponding to the inclination of the pertinent section, and the support of the feeler is brought toward the reference line also with a speed greater than that corresponding to the inclination of said path, until the arm 138, rotating around the shaft 134 in clockwise direction, causes the roller 145 of the microswitch 147 to return onto the edge of the sector of smaller radius of the cam 139 (position $c_2$) thus interrupting the operation of the motor and hence the motion of the discs and of the support of the feeler. The cam 139 again actuates the microswitch 147 when the guide 141, which at all times remains in contact with the edge of the control tape due to the action of the spring 143, has rotated around the shaft 134 by the angle necessary to make the roller 145 of the microswitch 147 pass back onto the edge of the sector of greater radius of the cam 139. Of course, in this case there is also intermittent operation of the motor and the various successive positions occupied by the guide 134 are represented by the broken line $K_2$ shown in dot-dash line in FIGURE 16.

Figure 17:
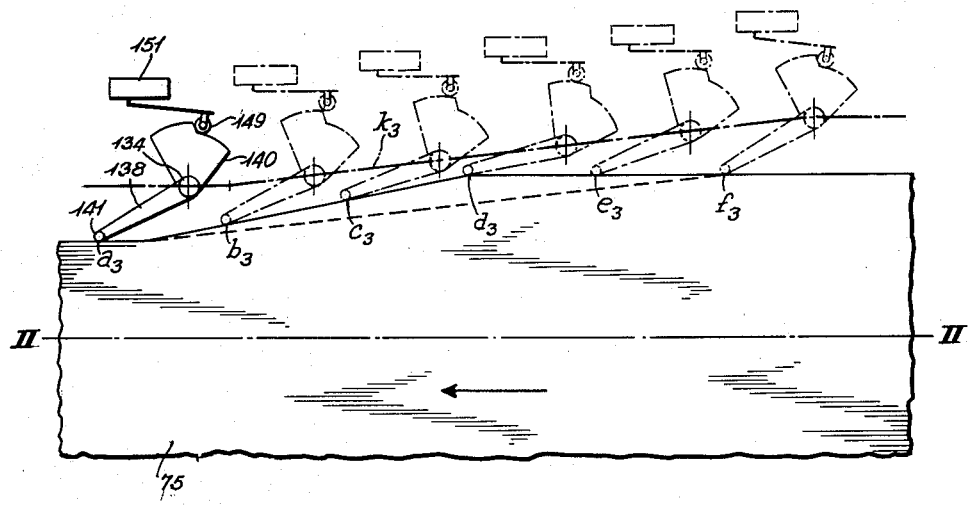
FIGURE 17 shows diagrammatically the various positions occupied by the feeler mechanism in the case of automatic control with a constant-speed motor and a profile tape section diverging with respect to the reference line with an inclination greater than that corresponding to the speed of the motor.

(III) Speed of the control motor less than that corresponding to the minimum slope of the tape. Profile section of the tape diverging with respect to the reference line (FIG. 17).

As soon as the guide 141, which is in contact with the section parallel to the reference line (position $a_3$), reaches the point of the profile of the tape which corresponds to the start of the diverging section, the arm 138 rotates in clockwise direction around the shaft 134, the arm being urged by the edge of the tape, and the cam 140 actuates the microswitch 151 (position $b_3$) which starts the motor. The discs start their movement with a speed less than that corresponding to the inclination of the pertinent section (the dashed line in FIG. 17) and the support of the feeler is moved away from the reference line also with a speed less than that corresponding to the inclination of the said section, and therefore the guide 141 will continue to rotate in clockwise direction causing the roller 149 of the microswitch 151 to roll along the edge of the sector of greater radius in direction opposite to the inclined plane 148 (positions $c_3$ and $d_3$) in this way maintaining microswitch 151 actuated at all times. The roller will again start to approach the inclined plane 148 only when the guide 141 comes into contact with the section parallel to the reference line which follows the divergent section (position $e_3$) and will return to the rest position when the discs 5 have carried out a movement equivalent to the amplitude contemplated by the pertinent section and the support has reached the distance from the reference line corresponding to the final position of the discs (position $f_3$). These conditions occur when the guide 141 is reached from the point of intersection of the profile of the tape with the theoretical line, which is shown as a dashed line in FIG. 17, and whose inclination corresponds to the velocity with which the discs have actually carried out the pertinent operation. In this case, the operation of the motor will be continuous, but the operation is protracted for a period of time greater than that contemplated on the profile of the tape. The various successive positions occupied by the shaft 134, which is rigidly connected to the support of the feeler, are shown by the straight line $K_3$ parallel to the theoretical line traced in dashes in FIGURE 17.

Figure 18:
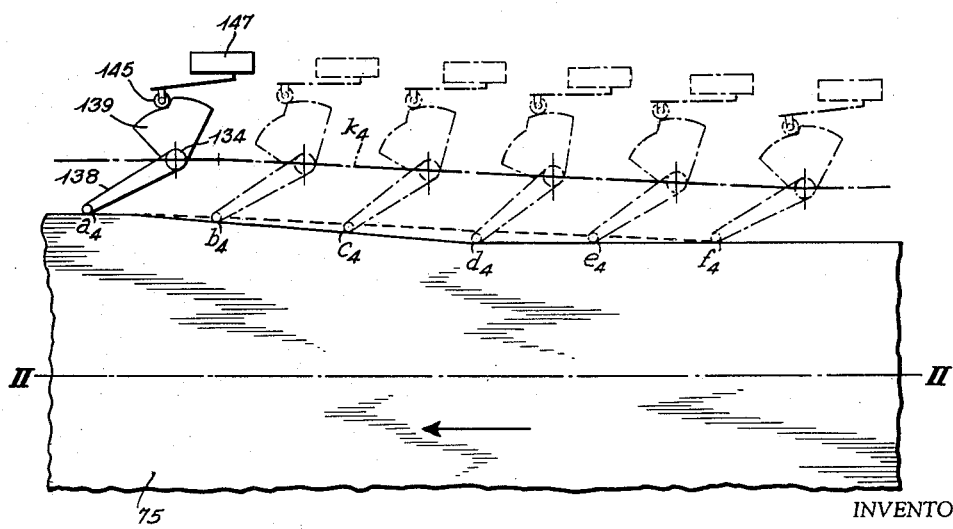
FIGURE 18 shows diagrammatically the various positions occupied by a feeler mechanism in the case of automatic control with a constant-speed motor and a profile tape section converging with respect to the reference line with an inclination greater than that corresponding to the speed of the motor.

(IV) Speed of the control motor less than that corresponding to the minimum slope of the tape. Section of profile converging with respect to the reference line (FIG. 18). As soon as the guide 141, which is in contact with the section parallel to the reference line (position $a_4$), is reached from the point of the profile of the tape which corresponds to the start of the converging section, the arm 138 rotates in counterclockwise direction around the shaft 134 under the action of the spring 143 and the cam 139 actuates the microswitch 147 (position $b_4$) which starts the motor. The discs start their movement with a speed less than that corresponding to the inclination of the section in question and the support of the feeler is moved toward the reference line also with a speed less than that corresponding to the inclination of the said section so that the guide 141 will continue to rotate in counterclockwise direction causing the roller 145 of the microswitch 147 to roll along the edge of the sector of greater radius, moving it away from the inclined plane 144 (positions $c_4$ and $d_4$) in this way maintaining the microswitch 147 continuously actuated. The roller 145 will again start to approach the inclined plane 144 only when the guide 141 comes in contact with the section parallel to the reference line which follows the convergent section (position $e_4$) and will return into the rest position when the discs 5 have carried out a movement of an amplitude equivalent to that contemplated in the pertinent section, and the support has reached the distance from the reference line corresponding to the final position of the discs. Also, in this case these conditions are present when the guide 141 reaches the point of intersection of the profile of the tape with the theoretical line (as shown in dashed line in the figure), the inclination of which corresponds to the speed with which the discs have actually carried out the operation. The operation of the motor is continuous, but the operation is protracted for a longer period of time than contemplated on the profile of the tape. The various successive positions occupied by the shaft 134 are represented by the straight line $K_4$ parallel to the theoretical line traced in dashes in FIG. 18.

From the above it is clear that the "follow-up" system with the motors of type A, i.e., constant speed motors, assures the exact amplitude of the movements of the discs independently of any possible differences between the linear speed of the tape and that of the motors which control the discs.

In the case of follow-up, however, with type B motors, that is variable speed motors, feeler mechanisms are used which act directly on the motor when they come in contact with the inclined sections of the profile of the tape, adapting the speed of the motor to the various inclinations of the said sections, whatever their inclination and direction may be; said mechanisms stop the motor only when they come in contact with tape sections parallel to the reference line. With variable speed motors, it is not only assured that the parts of the machine effect the various movements in the entire amplitude contemplated by the profile of the tape, but also that the start and stop of the individual phases actually coincide with the start and stop of the corresponding inclined sections of the tape.

In order to obtain devices with variable speed control, recourse may be had, for instance, in the case of automatic electric control, to feeler mechanisms comprising two potentiometers which make is possible to vary at will the voltage applied to the motor, depending on the inclination of the section of the profile in contact with the sensory part of the feeler or, in the case of oleodynamic control, feelers which regulate the flow of the oil at all times, as a function of the inclination of the section of the profile.

The control tape, in addition to having the profiles corresponding to the various operations of the discs on its edges, which is what constitutes the subject matter of this application, may also be supplemented, in the zone not covered by said profiles, by one or more series of controls arranged parallel to the reference line for those operations which do not require a follow-up control. These controls may also, for instance, be one or more series of holes, as shown in the tape section of FIG. 19, in which holes 152 have been punched corresponding to the slow operation of the motor 29, holes 153 have been punched corresponding to the stopped condition of all the motors 29, 37, 49 and 65, holes 154 have been punched for the control of the slow reverse rotation of the tire-building drum, holes 155 have been punched for the control of the slow forward rotation of the tire-building drum, holes 156 have been punched for the control of the discharge of the compressed fluid from the cylinders 57, holes 157 have been punched for the control of the introduction of the compressed fluid into cylinders 57, holes 158 have been punched for the control of the slow operation of the motor 37, hole 159 has been punched for the return of the tape to the starting position, and hole 160 has been punched for the control of the slow operation of the motor 49.

The positions of these holes can be recorded in the manner indicated in the description of the recording of the movements of the discs, or they may be established theoretically on the basis of the commencement and end of the individual operations indicated on the edges of the tape, and the possible prolongation of the actual operations as compared to those entered along the profile of the tape in the case of control by a motor whose speed is less than that corresponding to the pertinent inclined section.

The microswitches 161 correspond to the aforementioned series of holes (FIG. 10), and upon the entry of their rollers 162 into the individual holes which successively come into cooperation therewith, they can control the corresponding operations.

In order to control and coordinate the movements of the various parts of the machine, it is possible to use, for instance, an electrical relay control and regulating system comprising the motors, the necessary mechanical controls and the corresponding electrical circuit shown in FIGS. 20, 21, 22 and 23.

The motors connected in the circuit are the following:

The independently excited direct current motor 200 for rotating the tire-building drum in both directions and at two different speeds.

The independently excited direct current motor 14 for driving the stitching discs 1 from the centerline of the tire-building drum to the shoulders and vice versa.

The independently excited direct current motor 37 for displacing the supporting arms of the discs 5 at two different speeds in two directions parallel to the axis of rotation of the drum.

The independently excited direct current motor 29 for displacing the carriage 26 at two different speeds in both directions normal to the axis of rotation of the tire-building drum.

The independently excited direct current motor 49 for rotating the supporting arms of the discs 5 at two different speeds around the shafts 41.

The independently excited direct current motor 65 for unwinding and rewinding of the tapes controlling the automatic movements of the machine.

It is deemed advisable to use the motors 200, 37, 29 and 49 which can be energized with two different voltages so as to be able to operate at a high speed and at a low speed.

In the electric circuit, the following limit switches are provided:

The limit switch 201, which limits the proximity to which the discs 1 can approach each other at the centerline of the tire-building drum, and which is actuated by the cam 202 borne by one of the supports 16.

The limit switch 203, which limits the travel of the discs 1 from the centerline towards the shoulders of the tire-building drum, and which is actuated by the cam 204 borne by the support 16 to which the cam 202 is fastened.

The limit switch 205, which limits the travel of the housings 34 towards the shoulders of the tire-building drum, and which is actuated by the cam 206 borne by one of the housings 34.

The limit switch 207, which limits the travel of the housings 34 toward the centerline of the tire-building drum, and which is also actuated by the cam 206 borne by one of the housings 34.

The limit switch 208, which limits the forward rotation of the arms 55 around the shafts 41, and which is actuated by the cam 209 fastened to one of the shafts 41.

The limit switch 210, which limits the reverse rotation of the arms 55 around the shafts 41, and which is also actuated by the cam 209 fastened to the shaft 41.

The limit switch 211, which limits the advance of the carriage 26 normal to the axis of rotation of the drum, and which is actuated by the cam 212 fastened to the carriage 26.

The limit switch 213, which limits the backward motion of the carriage 26 normal to the axis of rotation of the drum, and which is also actuated by the cam 212 fastened to the carriage 26.

On the side of the drum 84 there are arranged microswitches, which correspond to a series of holes provided in the tape 82, and which actuate the following contacts:

The contact 214, which controls the stopping of the tapes in the position corresponding to the end of the individual phases of the tire-building cycle.

The contact 215 which controls the return of the tapes to the starting position.

The contact 216 which controls the stop of the return of the tape when the latter has reached the starting position.

The contact 217 which controls the introduction of the pressure fluid into the cylinders 57.

The contact 218 which controls the discharge of the pressure fluid from the cylinders 57.

The contact 219 which controls the slow forward rotation of the tire-building drum.

The contact 220 which controls the slow reverse rotation of the tire-building drum.

The contact 221 which controls the switching of the motor 29 from the high voltage source to the low voltage source.

The contact 222 which controls the switching of the motor 49 from the high voltage source to the low voltage source.

The contact 223 which controls the switching of the motor 37 from the high voltage source to the low voltage source.

To the supports of the feelers, moreover, are fastened the microswitches which actuate the following contacts:

The contact 224 which controls the advance of the carriage 26.

The contact 225 which controls the backward movement of the carriage 26.

The contact 226 which controls the forward rotation of the discs 5.

The contact 227 which controls the reverse rotation of the discs 5.

The contact 228 which controls the displacement of the housings 34 toward the shoulders of the tire-building drum.

The contact 229 which controls the displacement of the housings 34 from the shoulders toward the centerline of the tire-building drum.

The limit switches consist essentially of a shaft provided at one end with a roller which actuates electrical contacts when it is pressed by a cam. As soon as the pressure exerted by the cam ceases, the entire assembly returns to the initial position under the action of a spring.

In FIGS. 20, 21 and 22, the electric contacts have been shown in the position occupied by them when the machine is stopped in the rest position shown in FIG. 23, and the electric circuits are not energized.

The electric contacts will hereinafter be called "normally open" if they are open when they are at rest and closed when they are actuated, and will be called "normally closed" in the opposite case.

In FIGS. 21 and 22, the normally open contacts have been marked "n.a." while the normally closed contacts are marked "n.c." In FIG. 20 all the contacts are "normally open."

The arrows appearing on the contacts indicate the direction in which the actuating member of the said contacts is pressed.

The switching of the motor 200 between the two lines of different voltage is effected by means of its relays 200AN, 200IL and 200AL; the switching of the motor 37 is effected by means of its relays 37V and 37L, which alternately close the circuit of the motor in series with the operating contacts 37A and 37I; the switching of the motor 49 is effected by means of the relays 49V and 49L, which alternately close the circuit of the motor in series with the operating contacts 49A and 49I; the switching of the motor 29 is effected by means of the relays 29V and 29L which alternately close the circuit of the motor in series with the contacts 29A and 29I.

*Manual operation*

First of all the switch 230 must open the circuit between the terminals 231 and 232.

When voltage is applied to the circuit, the following movements are immediately obtained:

By means of the pushbuttons 233 and 234 and the contact 214 which is at present closed, the relay A65 is energized which, in turn, actuates the contacts $A65_1$, $A65_2$, $A65_3$, $A65_4$ and $A65_5$ without, however, causing other operations.

By means of the three contacts 221, 222 and 223 there are excited relays 37V, 49V and 29V which connect the circuits of the motors 37, 49 and 29 at high speed.

All the movements which will be described below for the said motors must therefore be understood to be at high speed.

*First phase of the stitching operation*

The pushbutton 235 is depressed (FIG. 21); by means of the pushbutton 233 and the limit switch 203 which is in the position indicated in the figure, current reaches the relay EV1 which actuates the contacts $EV1_1$, $EV1_2$ and the solenoid 236, which controls the valves which govern the pressing of the discs against the plies.

The contact $EV1_2$ closes the circuit between the terminals 237 and 238, closing the circuit of the relay 200AN by the normally closed circuit of the pushbutton 239, the normally closed contacts of the foot-operated switches or pedals 240 and 241 and the normally closed contact 65A9.

The relay 200AN closes the circuit of the motor 200, which causes the tire-building drum to rotate, and by actuating the contact 200AN1 closes the circuit between the terminals 242 and 238 so that the relay 200AN remains energized by means of this holding circuit in series with contact $A65_2$ which is now closed and with the normally closed contact of the pushbutton 239.

The contact $EV1_1$ short-circuits the pushbutton 235, and the relay EV1 and the solenoid 236 remain in this way energized by a holding circuit. The valves operated by the solenoid 236 are normally closed. When the solenoid 236 is energized, the valves control the introduction of the pressure fluid into the cylinders 18 and the discharge valves are closed. In this way the two discs 1 are pushed against the tire-building drum 8.

The delayed action contact EV1t is also closed by the relay EV1 but only after a certain predetermined period of time and serves to energize the relay 14A which controls the forward operation of the motor 14, that is to say the displacement of the supports 16 and therefore of the discs 1 from the position A to the position B parallel to the axis of rotation of the tire-building drum.

When the discs 1 reach the position B, one of the supports 16 presses the cam 204 against the limit switch 203. In this way the contact is opened and supplies current to the relays 14A and EV1 and to the solenoid 236 which are thus de-energized, bringing all the contacts of 14A and EV1 into the position shown in the figure. Thereupon, as a result, the motor 14 will stop and the solenoid 236 will be de-energized and will open the discharge valves of the cylinders 16 causing the compressed fluid to discharge and the discs 1 to move away from the tire-building drum.

At this point, the pushbutton 243 is depressed, the contact of which closes the circuit between the terminals 244 and 245, which are in series with the normally closed contact of pushbutton 233 and with the contact, also normally closed, of the limit switch 201, thus energizing the relay 14I. This relay closes its own contacts and energizes the motor 14 in the reverse direction of operation, controlling the return of the supports 16 toward the centerline of the tire-building drum. The relay 14I, by closing the contact $14I_1$ of a holding circuit, which shortcircuits the pushbutton 243, remains energized until the discs 1 have reached the position corresponding to the centerline of the drum and the cam 202 presses the limit switch 201 which deenergizes the relay 14I. The latter stops the motor 14 and returns its own contacts into the positions shown in the figure.

Second phase of the stitching operation

This phase is initiated with the tire-building drum rotating at normal speed.

A control switch $C_1$ of the type disclosed in the copending application Serial No. 521,314 filed July 11, 1955 by Ugo Sircana now abandoned, comprising a lever provided with a spherical fulcrum at one end, is actuated by hand so as to close the electric contact which is located in the direction of the motion. By such actuation, the following operations can be carried out:

*Control lever of $C_1$ to the right.*—The circuit between the terminals p and 246 is closed and in this way, by means of the limit switch 208, there is energized the relay 49A which controls the forward operation of the motor 49, and therefore the forward rotation of the stitching arms.

The relay 49A remains energized for the entire time that the control lever is pushed to the right and the rotation of the motor 49 can continue until cam 209, rotating with the shaft on which it is rigidly mounted, succeeds in engaging the limit switch 208, opening the corresponding contact, de-energizing the relay 49A and stopping the motor 49.

*Control lever of $C_1$ to the left.*—The circuit between the terminals p and 247 is closed and in this way, by means of the limit switch 210, there is energized the relay 49I, which controls the reverse operation of the motor 49, namely the rearward rotation of the stitching arms.

The relay 49I remains energized for the entire time that the control lever is pushed to the left and the rearward rotation of the motor can continue until the cam 209, which rotates with the shaft on which it is rigidly mounted, engages the limit switch 210, thus stopping the motor 49.

*Control lever of $C_1$ in downward position.*—The circuit between the terminals 248 and 249 is closed and in this way, by means of the limit switch 211, there is energized the relay 29A which controls the forward operation of the motor 29, and therefore the advance of the carriage 26 in the direction normal to the axis of rotation of the tire building drum. The advance is limited by the limit switch 211 when the latter is engaged by the cam 212. The contact corresponding to this limit switch opens the circuit of the relay 29A, stopping the motor 29.

*Control lever of $C_1$ in upper position.*—The circuit between the terminals 250 and 251 is closed and in this way, by means of the limit switch 213, there is energized the relay 29I which controls the reverse operation of the motor 29, and therefore the backward movement of the carriage 26 normal to the axis of rotation of the tire-building drum. The backward movement of the carriage 26 is limited by the limit switch 213 when it is engaged by the cam 212. The corresponding contact opens the circuit of the relay 29I and stops the motor 29.

The control lever of $C_1$ can also be brought into a diagonal position and thereby simultaneously actuate two contacts controlling in this way two of the aforesaid movements of the arms and of the carriage 26 at the same time.

Moreover, all the above-indicated operations can also be carried out while at the same time keeping the pedal 252 depressed. The latter closes the circuit between the terminals p and 253, in this way energizing the solenoid 254 which is normally closed and which controls the introduction of compressed fluid into the cylinders 57 by the openings 62. In this way the two supporting arms 55 of the discs 5 are pushed against the tire-building drum.

In addition to the forward rotation of the tire-building drum at normal speed, it is possible to obtain a slower rotation, both in forward and in reverse direction, controlled by means of foot pedals provided for that purpose. By depressing the pedal 241, the circuit between the terminals 255 and 256 is opened and thus the relay 200AN is de-energized if it is in an energized condition; in addition, the circuit between the terminals 255 and 257 is closed and therefore the relay 200AL receives current over the normally closed contact 65A9. The relay 200AL applies reduced voltage to the motor 200, causing the tire-building drum to rotate slowly, and actuates all its own contacts without effecting any other operations. As soon as the pedal 241 is released, the relay 200AL is de-energized, stopping motor 200 and its contacts are again brought into the position indicated in the drawing.

By depressing the pedal 240, the circuit is opened between the terminals 256 and 258 and therefore the relay 200AN is de-energized if it is energized. In addition, the circuit is closed between the terminals 256 and 259 and therefore the relay 200IL receives current through the normally closed contact 65A9 and the normally closed contact of the pedal 241. The relay 200IL applies a reduced voltage to the motor 200 for reverse operation, causing the drum to rotate slowly in reverse direction, and actuates all its own contacts without effecting any other operations. As soon as the pedal 240 is released, the relay 200IL is de-energized. This stops the motor 200 and the relay's contacts are again brought to the position indicated in the drawing.

*Third phase of the stitching operation*

The tire-building drum is rotated at slow speed as described above, or at high speed, by pressing the pushbutton 260 which closes the circuit between the terminals 237 and 238; in this way the circuit of the relay 200AN is closed through the normally closed contacts of the pushbutton 239, the normally closed contacts of the pedals 240 and 241 and the normally closed contacts 65A9.

The relay 200AN closes the circuit of the motor 200 which causes the tire-building drum to rotate and through contact 200AN1 closes the circuit between the terminals 242 and 238 so that the relay 200AN remains energized through a holding circuit in series with contact $A65_2$, which is now closed, and the normally closed circuit of the pushbutton 239.

By a second control switch $C_2$, similar to $C_1$ but having only two controls, the following two operations can be carried out:

*Control lever of $C_2$ in lower position.*—The circuit is closed between the terminals 261 and 262 and in this way current is supplied through the limit switch 207 to the relay 37I which, upon being energized, actuates the motor 37 controlling the reciprocal convergence of the stitching arms parallel to the axis of the drum. The movement is limited by the limit switch 207 when the latter is engaged by the cam 206. The contacts of the limit switch 207, upon opening, de-energize the relay 37I, stopping the motor 37.

*Control lever in upper position.*—The circuit is closed between the terminals 263 and 264 and in this way, through the limit switch 205, current is provided to the relay 37A which, being energized, actuates the motor 37 controlling reciprocal divergence of the stitching arms parallel to the axis of rotation of the tire building drum. This movement is limited by the limit switch 205 when it is engaged by the cam 206. The contact of the limit switch 205, upon opening, de-energizes the relay 37A, stopping the motor 37.

These operations may also be carried out while simultaneously keeping the pedal 252 depressed, that is with stitching arms pressed against the tire-building drum, as has been described above.

*Automatic control by means of tapes with contoured edges*

The switch 230 closes the circuit between the terminals 231 and 232.

When current is supplied to the circuit, the relays A65, 37V and 49V are energized as already described in connection with manual control.

The pushbutton 235 is depressed and the stitching with the discs 1 is effected as in the case of manual control. At the end of the stitching along the section A—B, the limit switch 203, actuated by the cam 204, opens the circuit between the terminals 265 and 266, de-energizing the relay EV1 and the solenoid 236 and closes the circuit between the terminals 265 and 231, thus energizing the relay A65A through the switch 230 and the pushbutton 233.

The relay EV1 opens all its contacts and in particular contact $EV1_2$ in the circuit of the relay 200AN, which, however, remains energized over its holding circuit comprising contacts 200AN1 and contacts $A65_2$ of relay A65 which is now energized. The solenoid 236, upon being de-energized, controls the discharge of the compressed fluid from the cylinders 18, causing the discs 1 to move away from the tire-building drum.

The relay A65A, upon being energized: closes the contacts A65A1 between the terminals 267 and 268 in circuit with relay A65, which, however, is already energized; closes the contacts A65A2 between the terminals 265 and 269 in circuit with the relay 65A, which is energized through pushbutton 233; and closes the contacts A65A3 between the terminals 237 and 238 in circuit with the relay 200AN which, however, is already energized.

Relay 65A, upon becoming energized: closes the contacts in circuit with the motor 65 which actuates the control tapes, initiating the operation of the corresponding device; closes the contacts 65A1 between the terminals 244 and 245 in circuit with the relay 14I. The latter closes the contact 14I1 in a holding circuit. It also closes the contacts which control the reverse operation of the motor 14 which continues until the cam 202 engages the limit switch 201. The circuit is thus opened between the terminals 265 and 244 and the relay 14I is de-energized and opens all its contacts, stopping the motor 14. The relay 65A also closes the contacts 65A2 which close the circuit between the terminals 270 and 269; the relay 65A then receives current also through 65A2 and A65I, which at this time are in closed position. The relay 65A also closes the contacts 65A3 between the terminals 271 and 253; the circuit of the solenoid 254, however, still remains open in accordance with the contacts 217 and $EV2_1$.

The relay 65A also closes the contacts 65A4, 65A5, and 65A6 which respectively close the circuits between the terminals 272 and 248, 273 and 250, p and 274, thus connecting the contacts 224, 225, 226 and 227 of the automatic actuating device in the control circuits of motors 49 and 29.

The relay 65A also closes the contacts 65A7 and 65A8 which connect the relays 200AN, 200AL, 200IL over the contacts 219 and 220 of the automatic actuating device; and opens the contact 65A9 between the terminals 255 and s, removing the possibility of control by the foot pedals 240 and 241.

The cam 202 is fastened to the supports of the stitching discs 1. As soon as the latter start their reverse movement, the said cam releases the limit switch 203 which returns to the position indicated in the drawing. In this way relay A65A is de-energized.

Relay A65A, upon becoming de-energized: opens the contact A65A1 between the terminals 267 and 268 in series with relay A65 which, however, remains energized over the contact 214; opens the contacts A65A2 between the terminals 265 and 269 in series with the relay 65A, which remains energized over the contacts A65 1 and 65A2, which are at present closed; opens the contacts A65A3 between the terminals 237 and 238 in the circuit of the relay 200AN which remains energized over the contacts A65 2 and 200AN1.

The automatic actuating device is now in operation and is able to actuate its own contacts, each of which operates as described below:

*Contact 217.*—When it is released, it closes the circuit between the terminals p and 275 so that over the normally closed contacts 65I2 the relay EV2 is energized while over the contacts 65A3, which is now closed, there is energized the solenoid 254 which controls the admission of compressed fluid into the cylinders 57, moving the discs 5 against the tire-building drum.

The relay EV2 closes the contacts $EV2_1$ so that both the relay EV2 and the solenoid 254 remain energized over the said contact and contact 218.

*Contacts 218.*—When they are opened, they break the circuit between the terminals p and 276, removing voltage from the relay EV2 and from the solenoid 254, since the contacts 217 are returned to their normal position shown in the drawing, opening the circuit between the terminals p and 275.

The relay EV2 opens contacts $EV2_1$ while the solenoid 254 controls the discharge of the pressure fluid from the cylinders 57 so that the discs 5 move away from the tire-building drum.

*Contacts 224.*—When actuated, they act as the contacts of the control switch $C_1$ which are closed when the lever is placed in the downward position, thus causing the carriage 26 to advance normal to the axis of the rotation of the tire-building drum.

*Contacts 225.*—When actuated, they act as the contacts of the control switch $C_1$ which are closed when the lever is placed in the upper position, causing the carriage 26 to move backward normal to the axis of rotation of the tire-building drum.

*Contacts 226.*—When actuated, they act as the contacts of the control switch $C_1$ which are closed when the lever is placed in the right hand position, causing the arms supporting the discs 5 to rotate forwardly.

*Contacts 227.*—When actuated, they act as the contacts of the control switch $C_1$ which are closed when the lever is placed in the left hand position, causing the arms supporting the discs 5 to rotate in the reverse direction.

*Contacts 228.*—When released, they short-circuit the contacts of the control switch $C_2$ inserted between the terminals 263 and 264, thus controlling the relay 37A as already described in connection with the upward position of the lever of the control switch $C_2$. They cause the reciprocal divergence of the arms supporting the discs 5, parallel to the axis of rotation of the tire-building drum.

*Contacts 229.*—When released, they short-circuit the contacts of the control switch $C_2$ inserted between the terminals 261 and 262 and control the relay 37I by an operation which is exactly equivalent to that already described with respect to the lower position of the lever of the control switch $C_2$. They cause reciprocal convergence of the supporting arms of the discs 5 parallel to the axis of rotation of the tire-building drum.

*Contacts 219.*—When released, they open the circuit between terminals 277 and 278, thus de-energizing the relay 200AN and subsequently close the circuit between the terminals 277 and 257, energizing relay 200AL over contacts 65A8, which are now closed.

The relay 200AL actuates motor 200, rotating the tire-building drum slowly; furthermore, it closes the contacts 200AL1 and 200AL2, being held over the normally closed contacts 220 and the contacts 65A8 which are now closed, so that when the contacts 219 return to the position indicated in the drawing, the relay 200AL maintains the tire-building drum in rotation until a new command is given.

In the event that the relay 200IL instead of 200AN is initially energized, the opening of the circuit between the terminals 277 and 278 effected by contacts 219 causes the deenergizing of the relay 200IL before the relay 200AL is energized.

*Contacts 220.*—When released, they open the circuit between terminals 279 and 278, de-energizing that one of the two relays 200AN and 200AL which may be energized; they furthermore close the circuit between the terminals 278 and 259, energizing the relay 200IL; the latter starts the motor 200, causing the tire-building drum to rotate in a reverse direction at slow speed and closes the contacts 200IL1 which maintain the relay energized over the normally closed contacts 219 and the contacts 65A8 which are now closed, so that the drum continues to rotate even after the contacts 220 have returned to the position indicated in the drawing.

*Contacts 221.*—When released, they open the circuit between the terminals $p$ and 280, de-energizing the relay 29V, which removes voltage from the motor 29 and furthermore closes the circuit between the terminals $p$ and 281. If the relays 29A and 29I are de-energized, no operation is brought about, the contacts 29A1 and 29I1 being open in the circuit in series with the relay 29L which cannot be energized; if, however, one of the two relays 29A or 29I is energized and therefore the corresponding contacts 29A1 or 29I1 are closed, the closing of circuit $p$–281 by the contacts 221 causes the energizing of the relay 29L which connects the input of the motor 29 to the low voltage line for the rotation at low speed; it furthermore closes the contacts 29L1 which, over the contacts $A65_5$ which are now closed, closes a holding circuit to the said relay 29L and opens the contacts 29L2, which finally open the circuit of the relay 29V.

Since the contacts 221 are immediately thereafter brought to the position shown in the drawing when the contacts $A65_5$, 29A1 or 29I1 open, the relay 29L is de-energized, thereby removing voltage from the motor 29, while the relay 29V is again energized over the contacts 221 and the contacts 29L2 which return to the closed position again, applying normal voltage to the motor.

*Contacts 222.*—When released, they open the circuit between the terminals $p$ and 282. If the relays 49A and 49I are de-energized, no operation is effected, the contacts 49A1 and 49I1 in the circuit in series with the relay 49L being open, so that said relay 49L cannot be energized; if, however, one of the two relays 49A or 49I is energized and the corresponding contacts 49A1 or 49I1 are closed, the closing of the circuit $p$–283 by the contacts 222 causes the energizing of the relay 49L which connects the input of the motor 49 to the low voltage line for rotation at low speed; the relay 49L furthermore closes contacts 49L1 which, over contacts $A65_4$ which are now closed, closes a holding circuit to the relay 49L, and opens the contact 49L2 which finally opens the circuit of the relay 49V.

Since the contacts 222 are returned to the position indicated in the drawing, immediately upon the opening of the contacts A654, 49A1 or 49I1, the relay 49L is de-energized and removes voltage from the motor 49 while the relay 49V is again energized over the contacts 222 and the contacts 49L2 which return into the closed position, again applying normal voltage to the motor.

*Contacts 223.*—When released, they open the circuit between the terminals $p$ and 284. If the relays 37A and 37I are de-energized, no operation takes place as the contacts 37A1 and 37I1 in the circuit in series with the relay 37L are open and the relay cannot be energized; if, however, one of the two relays 37A or 37I is energized and the corresponding contacts 37A1 or 37I1 are closed, the closing of the circuit $p$–285 by contacts 223 causes the energizing of the relay 37L which connects the low voltage line to the motor 37 for rotation at low speed; it moreover closes the contacts 37L1, which over the contacts $A65_3$, which are now closed, close a holding circuit to the relay 37L. The relay 37L also opens the contacts 37L2, which finally open the circuit of the relay 37V.

Since the contacts 223 are returned to the position shown in the drawing, immediately upon the opening of the contacts $A65_3$, 37A1 or 37I1, the relay 37L is de-energized and removes voltage from the motor 37, while the relay 37V is again energized over the contacts 223 and the contacts 37L2 which are returned to the closed position, thereby energizing the motor again with normal voltage.

*Contacts 214.*—When released, they open the circuit between the terminals 267 and 268, de-energizing the relay A65 which: opens the contacts $A65_1$, de-energizing the relay 65A; opens the contacts $A65_2$ in the circuit of the relay 200AN, de-energizing it in the event that it is energized and thus stopping the rotation of the tire-building drum; opens the contacts $A65_3$, de-energizing the relay 37L in the event that it is energized; opens the contacts $A65_4$, de-energizing the relay 49L in the event that it is energized; opens the contacts $A65_5$, de-energizing the relay 29L in the event that it is energized.

The relay 65A, upon being de-energized, stops the motor 65 of the automatic actuating device and: opens contacts 65A1 in the circuit of the relay 14I which is already de-energized; opens the contacts 65A2, opening the holding circuit of the relay 65A; opens the contacts 65A3, de-energizing the solenoid 254 which is in an energized condition; opens the contacts 65A4, 65A5, and 65A6, excluding the controls of the automatic device from the circuit of the relays 49A, 49I, 29A and 29I, de-energizing them if they are energized and stopping the motors 49 and 29; opens the contacts 65A7 and 65A8 which open the circuits of the relays 200AN, 200AL and 200IL, de-energizing that one of them which is energized and thus stopping the rotation of the tire-building drum; closes the contacts 65A9, inserting in the circuits of the relays 200AN, 200AL and 200IL the contacts of the foot pedals 240 and 241, which may now be actuated as has been described above.

*Contacts 215.*—When released, namely at the end of the cycle of phases provided on the control tape, simultaneously with contacts 214, which operate as described above, they close the circuit between the terminals 265 and 286, energizing the relay 65I which starts the small motor for the automatic device in reverse operation for the return of the tapes to the starting position. The relay 65I furthermore closes the contacts 65I1, energizing a holding circuit to the relay over the contacts 216 and the normally closed contacts of the pushbuttons 233 and 234 and it finally opens the contacts 65I2, preventing any energization of the relay EV2 and of the solenoid 254.

*Contacts 216.*—When released, namely at the moment when the control tapes have returned to the starting position, they open the circuit between the terminals 267 and 287, de-energizing the relay 65I which stops the small motor and returns its contacts to the position indicated in the drawing, so that the device is ready to start a new cycle of operations.

During its operation, the automatic actuating device can be stopped by depressing the pushbutton 233. In this way the circuit of relays 65A and A65 is opened, and these relays are de-energized, returning their contacts to the position indicated in the drawing.

The contacts of relay 65A in the circuit of the motor 65 of the automatic actuating device are opened, stopping it; the other contacts cause the stopping of the machine as has been described for the case in which the contacts 214 of the automatic device are released.

The contacts of relay A65 open circuits which are otherwise already open.

In any position of the automatic actuating device the latter can be brought into a previously occupied position by depressing the pushbutton 234. This at first opens the circuit between the terminals 265 and 267, de-energizing the relay A65, which causes the stopping of the automatic actuating device and of the machine as has been described above. Furthermore, it closes the circuit between the terminals 265 and 286, thus energizing the relay 65I, which closes its contacts in the reverse operating circuit of the motor 65 of the automatic actuating device and opens the circuit of EV2 and the solenoid 254, thus preventing the contacts 217 from energizing them during the reverse operation. The contacts 65I1 close the circuit 287—286, but the relay 65I is not energized over a holding circuit, the circuit 265—267 being opened by means of the contacts, now open, of the pushbutton 234.

The reverse operation continues until the pushbutton 234 is depressed; when it is released, the relay 65I is de-energized and returns its contacts to the position indicated in the drawing, and the circuit of relay A65 is again closed unless the stopping is caused in a position in which the contacts 214 are not actuated. The relay A65, becoming energized, effects the operations which have already been described.

With the automatic actuating device stopped in any position, it is possible to again start it by depressing the pushbutton 288, thus closing the circuit of relay A65A between the terminals 265 and 231. The relay A65A: closes the contacts A65A1, energizing relay A65, if the latter is not already energized over the contacts 214; closes the contacts A65A2, energizing relay 65A which causes the operations already described; closes the contacts A65A3 in the circuit of the relay 200AN as already stated.

If the automatic device is stopped in a positon in which the contacts 214 are released, it is necessary to keep the pushbutton 288 depressed until said contacts are again depressed.

It must be borne in mind that the drum when in normal operation can be stopped at any moment, both during the manual control cycle and during the automatic control cycle by depressing the pushbutton 239, which de-energizes the relay 200AN, stopping the motor 200.

The drum may also be again placed in rotation at normal speed at any moment by operating the pushbutton 260 as described above.

In order to make still more obvious the advantages obtained by the above-described method, the following may also be emphasized:

By the methods used up to the present time, certain operations always had to be finished by hand, since with the use of the discs, they often came out poorly, while the automatic control of the present invention can be perfected by suitable adjustments so that these operations always are carried out properly and more rapidly.

Other operations were very difficult to carry out, above all due to the difficulty of bringing the discs against the plies at the proper point and with the best inclination. The present automatic control is able to eliminate this difficulty, making it possible to bring the roller at all times into the correct positon and with the correct inclination.

Certain stitching operations caused folds, since the speed of rotation of the drum was not the best suited for the operation. With the present automatic control, it is possible to vary the speed or reverse the direction of rotation at the best moment.

By the present automatic control it is finally possible to carefully study the control profile in such a manner as to reduce to a minimum the time necessary to carry out the individual operations and to make them perfect for every type of tire.

The means described above must naturally be considered merely as examples of the method which is the subject matter of the present invention and not as a limitation thereof, it being possible to create other forms without thereby going beyond the scope of the present invention.

Thus, for instance, the control tape can be replaced by rotating cams or other equivalent means; it may have a ring shape and be mounted on only two drums; it may be moved also at different speeds or be held stationary while the supports of the feelers move, not only in transverse direction but also parallel to the reference line of the profiles entered on the tape. The continuous conventional representation of the movements which must be effected by certain elements of the machine may also be of different type, for instance entered in the central part of the tape in relief or engraved.

What is claimed is:

1. A device for the automatic control of movements of given parts of a machine comprising at least one first means on which there is recorded in the form of a profile at least one continuous succession of control signals to be transmitted to the corresponding part of said machine; a second means for the moving of said first means at constant speed in the direction corresponding to the succession of machine operations; a third means, one for each first means, adapted to sense the continuous succession of control signals recorded on said first means and to transmit said control signals to the corresponding part of the machine, said third means moving in a direction different from that in which said first means is moved, a mechanical connection between said third means and the corresponding controlled element adapted to displace said third means so that for every position of said third means on its trajectory, there corresponds, in accordance with a predetermined function, a predetermined position of the controlled part on the trajectory traversed by it; said third means including a support, a shaft rigidly fixed to said support, two cams and an arm mounted on said shaft, said cams and said arm being fixed to said shaft so as to turn together with said shaft, a feeler mounted at the free end of said arm and in contact with said profile, each cam comprising two circular sectors of different radius with their center on the axis of said shaft, an inclined plane connecting said two circular sectors, a microswitch for each cam in such position as to be actuated by said inclined plane and by said circular sector of greater radius when said two cams rotate around their center; means for adjusting the mutual position of the two cams and of the arm; elastic means for causing the unit comprising said cams, arm, and feeler to rotate around said shaft.

2. A device for the automatic control of machine movements comprising a rigid tape having an edge which is profiled in accordance with a continuous succession of lines which correspond to a continuous succession of machine movements, means for advancing said tape in a given direction, a slidable support mounted adjacent the path of movement of said tape, a sensing means movably mounted on said slidable support, said sensing means including a shaft mounted on said slidable support, a pair of cams rotatably mounted on said shaft, an arm rotatably mounted on said shaft, said cams and said arm being attached together for rotation as a unitary mechanism around said shaft, said arm carrying a feeler bearing against the profiled edge of said rigid tape, each of said cams comprising two circular sectors of different radius having a common center coinciding with the axis of said shaft, a switch means mounted on said slidable support for operating a motor which produces said machine movements, said switch means including a pair of microswitches, one for each cam, engaging said cams and actuated by said circular sectors of larger radius to cause rotation in opposite directions, respectively, of said motor, means for resiliently urging said arm in such a direction as to urge said feeler against the profiled edge of said tape, said arm as it moves relative to said support in accordance with the configuration of said profile, actuating said microswitches to turn on and off said motor, and means engaging said slidable support and operated by said motor for moving said slidable support in a direction tending to move said sensing means towards and away from the profiled edge of said tape.

3. An automatic control device as set forth in claim 2 wherein the actuated portions of said microswitches are arranged in spaced relation and wherein the circular sectors of larger radius are arranged in adjacent overlapping relation such that, when said unitary mechanism consisting of said two cams and said arm is caused to rotate from a given intermediate position about said shaft in one direction, said motor is controlled for rotation in a given direction, and such that, when said unitary mechanism is caused to rotate from said given intermediate position about said shaft in the reverse direction, said motor is controlled for movement in the opposite direction, said motor being deenergized when said unitary mechanism is in said intermediate position.

4. A device for automatically controlling the movement of an element of a machine comprising a movable machine element, a reversible motor for driving said machine element in a forward direction from an initial position of said element and reverse direction to move said element back towards its initial position, a tape movable over a predetermined path, means for moving said tape over said predetermined path, said tape having thereon a profiled edge of predetermined shape, a slidable support mounted adjacent the path of movement of said tape, a shaft mounted on said slidable support, a first cam freely rotatably mounted on said shaft, a second cam freely rotatably mounted on said shaft and connected with said first cam, an arm freely rotatably mounted on said shaft and connected with said two cams for rotation therewith about said shaft, a feeler mounted on the outer end of said arm engaging the profiled edge of said tape, a spring means operatively connected between said arm and said slidable support for resiliently urging said feeler against said profiled edge of said tape, a first microswitch mounted on said movable support and bearing against said first cam, said first microswitch being actuated by said first cam upon the rotary movement of said cams about said shaft in a given direction to cause rotation of said motor in a given direction, a second microswitch mounted on said movable support and bearing against said second cam, said second microswitch being actuated by said second cam upon the rotary movement of said cams about said shaft in the reverse direction so as to cause rotation of said motor in the opposite direction, and means driven by said motor for moving said slidable support in the same direction as said feeler is moved by said tape.

5. Apparatus for automatically controlling the movement of a machine element comprising a reversible motor for driving said machine element in forward and reverse directions away from and towards an initial starting position of said element, respectively, a tape movable over a predetermined path, means for driving said tape over said predetermined path, said tape being provided with a profiled edge in the form of a plurality of lines parallel to the direction of movement of the tape and connected together so as to present a continuous profile at said profiled edge, at least one of said lines parallel to the direction of movement of said tape being a reference line representing the initial position of said machine element, at least one of said lines parallel to the direction of movement of said tape being spaced from and parallel to said reference line, a slidable support mounted adjacent the path of movement of said tape, a shaft mounted on said slidable support, an arm pivotally mounted on said shaft, a feeler mounted on one end of said arm and bearing against the profiled edge of said tape, means resiliently urging said feeler against said profiled edge of said tape, switch means mounted on said slidable support for actuating said motor to rotate the same in said forward and reverse directions, means operatively connected to said arm for actuating said switch means, means driven by said motor for moving said slidable support so as to move said feeler towards and away from the profiled edge of said tape, and in the same direction as said feeler is moved by the profiled edge of said tape, whereby, as said feeler moves over said profile from said reference line toward said spaced line, said arm will pivot relative to said slidable support causing said switch actuating means to actuate said switch means so as to actuate said motor for driving said machine element away from its initial position while said motor simultaneously drives said slide moving means in a direction tending to move said feeler from said reference line towards said spaced line, and whereby, as said feeler, upon the continued movement of said tape, moves thereafter from said spaced line towards said reference line, said arm is pivoted relative to said slidable support so as to actuate said switch means and to actuate said motor for driving said machine element towards its initial position while said motor drives said slide moving means simultaneously in a direction tending to move said feeler from said spaced line towards said reference line.

6. Apparatus as set forth in claim 5 including means for stopping said tape moving means when said tape has advanced a predetermined amount.

7. Apparatus as set forth in claim 5 including additional means for actuating said tape moving means to move in a reverse direction for returning said tape to its starting position.

8. Apparatus as set forth in claim 5 including means for manually moving said slidable support so that said control apparatus may be adjusted for operation with a second tape which can be replaced for said first mentioned tape, said second tape having thereon a profile different from that of said first tape.

9. Apparatus for automatically controlling the movement of a machine element comprising a reversible motor for driving said machine element in forward and reverse directions away from and towards an initial starting position of said element, respectively, a tape movable over a predetermined path, means for driving said tape over said predetermined path, said tape being provided with a profiled edge in the form of a plurality of lines parallel to the direction of movement of the tape and connected together so as to present a continuous profile at said profiled edge, at least one of said lines parallel to the direction of movement of said tape being a reference line representing the initial position of said machine element, at least one of said lines parallel to the direction of movement of said tape being spaced from and parallel to said reference line, said spaced line being connected to said reference line by an inclined line, a slidable support mounted adjacent the path of movement of said tape, a shaft mounted on said slidable support, an arm pivotally mounted on said shaft, a feeler mounted on one end of said arm and bearing against the profiled edge of said tape, means resiliently urging said feeler against said profiled edge of said tape, switch means mounted on said slidable support for actuating said motor to rotate the same in said forward and reverse directions, means operatively connected to said arm for actuating said switch means, means driven by said motor for moving said slidable support so as to move said feeler towards and away from the profiled edge of said tape, and in the same direction as said feeler is moved by the profiled edge of said tape, whereby, as said feeler moves from said reference line over said inclined line towards said spaced line, said arm will pivot relative to said slidable support causing said switch actuating means to actuate said switch means so as to actuate said motor for driving said machine element away from its initial position while said motor simultaneously drives said slide moving means in a direction tending to move said feeler from said reference line towards said spaced line, and whereby, as said feeler, upon the continued movement of said tape, moves thereafter from said spaced line towards said reference line, said arm is pivoted relative to said slidable support so as to actuate said switch means and to actuate said motor for driving said machine element towards its initial position while said motor drives said slide moving means simultaneously in a direction tending to move said feeler from said spaced line towards said reference line.

References Cited in the file of this patent

UNITED STATES PATENTS

| | | |
|---|---|---|
| 2,410,295 | Kuehni | Oct. 29, 1946 |
| 2,511,956 | Wetzel | June 20, 1950 |
| 2,555,343 | Jones | June 5, 1951 |
| 2,715,703 | Schuck | Aug. 16, 1955 |
| 2,741,732 | Cunningham | Apr. 10, 1956 |
| 2,747,151 | Jaeger | May 22, 1956 |
| 2,755,422 | Livingston | July 17, 1956 |
| 2,777,354 | Stickney et al. | Jan. 15, 1957 |
| 2,786,396 | Wetzel | Mar. 26, 1957 |